(12) United States Patent
Ishii et al.

(10) Patent No.: US 11,767,446 B2
(45) Date of Patent: Sep. 26, 2023

(54) (METH)ACRYLIC COPOLYMER, COATING MATERIAL COMPOSITION, COATED ARTICLE AND METHOD FOR FORMING MULTILAYER COATING FILM

(71) Applicant: Mitsubishi Chemical Corporation, Chiyoda-ku (JP)

(72) Inventors: Takuhiro Ishii, Tokyo (JP); Junichi Nakamura, Tokyo (JP); Shinsuke Haraguchi, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/401,504

(22) Filed: May 2, 2019

(65) Prior Publication Data

US 2019/0256733 A1 Aug. 22, 2019

Related U.S. Application Data

(63) Continuation of application No. PCT/JP2017/041485, filed on Nov. 17, 2017.

(30) Foreign Application Priority Data

Nov. 17, 2016 (JP) ................................. 2016-224089

(51) Int. Cl.
| | |
|---|---|
| *C09D 153/00* | (2006.01) |
| *C08F 297/02* | (2006.01) |
| *C09D 151/00* | (2006.01) |
| *C08F 285/00* | (2006.01) |
| *B05D 1/36* | (2006.01) |
| *C08F 2/38* | (2006.01) |
| *B05D 1/38* | (2006.01) |
| *C09D 133/14* | (2006.01) |
| *B05D 7/24* | (2006.01) |
| *C09D 201/06* | (2006.01) |
| *C08F 220/14* | (2006.01) |
| *C08F 220/38* | (2006.01) |

(52) U.S. Cl.
CPC ............ *C09D 153/00* (2013.01); *B05D 1/36* (2013.01); *B05D 1/38* (2013.01); *B05D 7/24* (2013.01); *C08F 2/38* (2013.01); *C08F 285/00* (2013.01); *C08F 297/026* (2013.01); *C09D 133/14* (2013.01); *C09D 151/003* (2013.01); *C09D 201/06* (2013.01); *C08F 220/14* (2013.01); *C08F 220/382* (2020.02); *C08F 2500/26* (2013.01); *C08F 2800/20* (2013.01)

(58) Field of Classification Search
CPC ........ C08F 220/06; C08F 2/38; C08F 285/00; C08F 297/026; C08F 220/382; C08F 220/14; C08F 2500/26; C08F 2800/20; C09D 151/003; C09D 153/00; C09D 133/14; C09D 201/06; B05D 1/36; B05D 1/38; B05D 7/24
See application file for complete search history.

(56) References Cited

U.S. PATENT DOCUMENTS

| | | | | |
|---|---|---|---|---|
| 5,319,045 A | * | 6/1994 | Ohta | ................... C08F 290/061 |
| | | | | 526/274 |
| 2006/0100351 A1 | | 5/2006 | Butera et al. | |
| 2007/0142507 A1 | * | 6/2007 | Huybrechts | ........ C09D 151/003 |
| | | | | 524/69 |
| 2012/0202082 A1 | | 8/2012 | Fujii | |
| 2019/0256733 A1 | * | 8/2019 | Ishii | ........................ B05D 1/38 |
| 2020/0010697 A1 | * | 1/2020 | Taniguchi | ............ C09D 183/12 |
| 2020/0017617 A1 | * | 1/2020 | Taniguchi | ............. C08F 220/18 |

FOREIGN PATENT DOCUMENTS

| | | |
|---|---|---|
| CA | 2149399 | 11/1995 |
| CN | 101050258 A | 10/2007 |
| CN | 102597028 A | 7/2012 |
| CN | 103614045 A | 3/2014 |
| CN | 104053690 A | 9/2014 |
| CN | 105793305 A | 7/2016 |

(Continued)

OTHER PUBLICATIONS

International Search Report dated Feb. 6, 2018 in PCT/JP2017/041485 filed Nov. 17, 2017 (with English Translation).
The partial Supplementary European Search Report dated Oct. 24, 2019 in Patent Application No. 17870786.5, 11 pages.
Extended European Search Report dated March 16, 2020 in corresponding European Patent Application No. 17870786.5, 13 pages
Combined Chinese Office Action and Search Report dated Feb. 3, 2021 in corresponding Chinese Patent Application No. 201780070091.8 (with English Translation), 18pages.
Chinese Office Action dated Feb. 7, 2022 in Chinese Patent Application No. 201780070091.8 (with English translation), 14 pages.

(Continued)

*Primary Examiner* — Robert S Jones, Jr.
*Assistant Examiner* — Jiangtian Xu
(74) *Attorney, Agent, or Firm* — Oblon, McClelland, Maier & Neustadt, L.L.P.

(57) ABSTRACT

Provided is a coating material composition that enables an efficient repair operation of a coating film after coating, a (meth)acrylic copolymer that is suitable for obtaining the coating material composition, and a coated article and a method for forming a multilayer coating film using the coating material composition. The (meth)acrylic copolymer includes: a constituent unit derived from a macromonomer (a); and a constituent unit derived from a vinyl monomer (b), a hydroxyl value of the (meth)acrylic copolymer is equal to or greater than 120 mgKOH/g and equal to or less than 260 mgKOH/g, and the content of a constituent unit that has a primary hydroxyl group of the (meth)acrylic copolymer is equal to or less than 30 parts by mass with respect to 100 parts by mass of the constituent unit derived from the macromonomer (a) and the constituent unit derived from the vinyl monomer (b).

17 Claims, No Drawings

(56) References Cited

FOREIGN PATENT DOCUMENTS

| EP | 1 908 807 A1 | 4/2008 |
|---|---|---|
| GB | 2 453 266 A | 4/2009 |
| JP | 1-272679 | 10/1989 |
| JP | 9-118858 | 5/1997 |
| JP | 2012-126896 | 7/2012 |
| JP | 2013-194152 A | 9/2013 |
| JP | 2016-40390 | 3/2016 |
| WO | WO 96/05260 A1 | 2/1996 |
| WO | WO 2015/084960 A1 | 6/2015 |

OTHER PUBLICATIONS

Toagosei Co., Ltd., Macromonomers product catalog, "Macromonomers-series", Jan. 5, 2010. retrieved from the internet on Aug. 16. 2021, URL: https://toagosei.co.jp/products/polymer/acryl/pdf/acryl2_02ctig.pdf (with partial English tranlsation), 3 pages.

Office Action dated Jul. 13, 2021, Japanese Patent Application No. 2018-551708 filed Nov. 17, 2017 (with machine generated English translation).

Office Action dated Jul. 13, 2021, Japanese Patent Appiication No. 2018-551708 filed Nov. 17, 2017 (with machine generated English translation).

\* cited by examiner

(METH)ACRYLIC COPOLYMER, COATING MATERIAL COMPOSITION, COATED ARTICLE AND METHOD FOR FORMING MULTILAYER COATING FILM

This application is a continuation application of International Application No. PCT/JP2017/041485, filed on Nov. 17, 2017, which claims the benefit of priority of the prior Japanese Patent Application No. 2016-224089, filed on Nov. 17, 2016, the content of which is incorporated herein by reference.

TECHNICAL FIELD

The present invention relates to a (meth)acrylic copolymer, a coating material composition, a coated article, and a method for forming a multilayer coating film.

BACKGROUND ART

For coating of a vehicle or the like, a base coating with a coloring agent blended therein is coated, a clear coating containing a film forming resin and a curing agent is then coated thereon, and thermal curing is performed. Examples of the film forming resin include a copolymer of a (meth) acrylic monomer that has a hydroxyl group and another vinyl-based monomer.

CITATION LIST

Patent Document

[Patent Document 1] Japanese Unexamined Patent Application, First Publication No. 2016-40390

SUMMARY OF INVENTION

Problems to be Solved by the Invention

However, it is difficult to efficiently perform repair operation through polishing with a sand paper or the like after the coating for an acrylic coating that uses an acrylic resin as described above as a film forming resin.

Reducing hardness of the coating film by reducing the amount of the curing agent in order to improve efficiency of the repair operation after the coating is conceivable. It becomes easier to perform polishing, and the operation efficiency is improved, as the hardness of the coating film decreases. However, if the hardness of the coating film is low, scratching tends to occur due to sand, brush for car cleaning, and the like.

The present invention was made in view of the aforementioned circumstances, and an object thereof is to provide a coating material composition that enables an efficient repair operation of a coating film after coating, a (meth)acrylic copolymer that is suitable for obtaining the coating material composition, and a coated article and a method for forming the multilayer coating film using the coating material composition.

Means for Solving Problem

The present invention has the following aspects.

[1] A (meth)acrylic copolymer including:
a constituent unit derived from a macromonomer (a); and
a constituent unit derived from a vinyl monomer (b),
in which a hydroxyl value of the (meth)acrylic copolymer is equal to or greater than 120 mgKOH/g and equal to or less than 260 mgKOH/g, and
the content of the constituent unit that has a primary hydroxyl group of the (meth)acrylic copolymer is equal to or less than 30 parts by mass with respect to 100 parts by mass of the constituent unit derived from the macromonomer (a) and the constituent unit derived from the vinyl monomer (b).

[2] The (meth)acrylic copolymer according to [1], in which the content of a constituent unit that has at least one of a secondary hydroxyl group and a tertiary hydroxyl group is equal to or greater than 15 parts by mass and equal to or less than 60 parts by mass with respect to 100 parts by mass of all constituent units of the (meth)acrylic copolymer.

[3] A (meth)acrylic copolymer including:
a constituent unit derived from a macromonomer (a); and
a constituent unit derived from a vinyl monomer (b),
in which at least one of the constituent units derived from the macromonomer (a) and the constituent unit derived from the vinyl monomer (b) has a hydroxyl group,
a gel fraction of one day after coating is equal to or less than 70%, and
a gel fraction of eight days after coating is equal to or greater than 80%.

[4] A (meth)acrylic copolymer including:
a constituent unit derived from a macromonomer (a); and
a constituent unit derived from a vinyl monomer (b),
in which at least one of the constituent units derived from the macromonomer (a) and the constituent unit derived from the vinyl monomer (b) has a hydroxyl group, and
a relationship between a gel fraction of one day after coating and a gel fraction of eight days after coating is represented by the following formula (I).

$$100 \geq (\text{gel fraction of eight days after coating}) - (\text{gel fraction of one day after coating}) \geq 40 \quad (I)$$

[5] The (meth)acrylic copolymer according to any one of [1] to [4],
in which a number average molecular weight of the macromonomer (a) is equal to or greater than 500 and equal to or less than 100000.

[6] The (meth)acrylic copolymer according to any one of [1] to [5],
in which the macromonomer (a) has a radical polymerizable group and two or more constituent units represented by the following formula (a').

[chem. 1]

[7] A coating material composition including:
the (meth)acrylic copolymer according to any one of [1] to [6].

[8] The coating material composition according to [7],
in which the content of the (meth)acrylic copolymer is equal to or greater than 30 parts by mass with respect to a solid content of a resin in the coating material composition.

[9] The coating material composition according to [7] or [8], further including:
a curing agent.

[10] The coating material composition according to any one of [7] to [9],
in which Martens hardness of a coating film of one day after coating is equal to or less than 10, and Martens hardness of a coating film of eight days after coating is equal to or greater than 100.

[11] A coated article that is coated with the coating material composition according to any one of [7] to [10].

[12] A method for forming a multilayer coating film, including:
forming a first coloring base coating film by applying a first coloring base coating to a cured coating film of an electrodeposition coating;
then forming a second coloring base coating film by applying a second coloring base coating to the first coloring base coating film without preheating the first coloring base coating film or after preheating or thermally curing the first coloring base coating film;
then forming a clear coating film by preheating the first coloring base coating film and the second coloring base coating film and then coating a clear coating on the second coloring base coating film; and
thermally curing the formed three coating films to form a multilayer coating film at the same time,
in which the coating material composition according to any one of [7] to [10] is used as the clear coating.

Effects of Invention

According to the invention, it is possible to provide a coating material composition that enables an efficient repair operation of a coating film after coating, a (meth)acrylic copolymer that is suitable for obtaining the coating material composition, and a coated article and a method for forming a multilayer coating film using the coating material composition.

MODE FOR CARRYING OUT OF THE INVENTION

The following definition of terms will be applied to the specification and claims.

A "(meth)acrylic copolymer" means a copolymer in which at least a part of constituent units is a constituent unit derived from a (meth)acrylic monomer. The (meth)acrylic copolymer may further have a constituent unit derived from a monomer other than the (meth)acrylic monomer (for example, a vinyl monomer such as styrene).

The "constituent unit" is a constituent unit derived from a monomer that is formed through polymerization of the monomer.

The "monomer" means a polymerizable compound (polymerizable monomer).

The "vinyl monomer" means a monomer that has an ethylenically unsaturated bond (a polymerizable carbon-carbon double bond).

The "(meth)acrylic monomer" means a monomer that has (meth)acryloyl group.

The "(meth)acryloyl group" is a general term for collectively referring to an acryloyl group and a methacryloyl group. "(Meth)acrylate" is a general term for collectively referring to acrylate and methacrylate. "(Meth)acrylic acid" is a general term for collectively referring to an acrylic acid and a (meth)acrylic acid. "(Meth)acrylonitrile" is a general term for collectively referring to acrylonitrile and methacrylonitrile. "(Meth)acrylamide" is a general term for collectively referring to acrylamide and methacrylamide.

[(Meth)Acrylic Copolymer]

A (meth)acrylic copolymer according to the invention (hereinafter, also referred to as a "copolymer (A)") includes a constituent unit derived from a macromonomer (a) and a constituent unit derived from a vinyl monomer (b).

The copolymer (A) has a structure of a graft copolymer or a block copolymer in which a polymer chain derived from the macromonomer (a) and a polymer chain configured of the constituent unit derived from the vinyl monomer (b) are bonded.

<Constituent Unit Derived from Macromonomer (a)>

The macromonomer (a) is a compound that has two or more constituent units derived from a radical polymerizable group and a monomer that has a radical polymerizable group (hereinafter, also referred to as a "monomer (a1)"). The two or more constituent units that the macromonomer (a) has may be the same or different from each other.

As the radical polymerizable group that the macromonomer (a) has, a group that has an ethylenically unsaturated bond is preferably used. Examples of the group that has an ethylenically unsaturated bond include $CH_2=C(COOR)—CH_2—$, a (meth)acryloyl group, a 2-(hydroxymethyl)acryloyl group, and a vinyl group.

Here, R represents a hydrogen atom, a substituted or unsubstituted alkyl group, a substituted or unsubstituted alicyclic group, a substituted or unsubstituted aryl group, or a substituted or unsubstituted heterocyclic group.

Examples of the unsubstituted alkyl group in R include a branched or linear alkyl group that has 1 to 20 carbon atoms. Specific examples of the branched or linear alkyl group that has 1 to 20 carbon atoms include a methyl group, an ethyl group, an n-propyl group, an i-propyl group, an n-butyl group, a t-butyl group, an i-butyl group, a pentyl group, a hexyl group, a 2-ethylhexyl group, a heptyl group, an octyl group, an isooctyl group, a nonyl group, a decyl group, an i-decyl group, an undecyl group, a dodecyl group, a tridecyl group, a tetradecyl group, a pentadecyl group, a hexadecyl group, a heptadecyl group, an octadecyl group, a nonadecyl group, and an icosyl group. It is also possible to use an alkyl group that has 20 or more carbon atoms.

The unsubstituted alicyclic group in R may be a monocyclic alicyclic group or a polycyclic alicyclic group, and examples thereof include an alicyclic group that has 3 to 20 carbon atoms. A saturated alicyclic group is preferably used as the alicyclic group, and specific examples thereof include a cyclopropyl group, a cyclobutyl group, a cyclopentyl group, a cyclohexyl group, a cycloheptyl group, a bicyclo[2.2.1]heptyl group, a cyclooctyl group, and an adamantyl group.

Examples of the unsubstituted aryl group in R include an aryl group that has 6 to 18 carbon atoms. Specific examples of the aryl group that has 6 to 18 carbon atoms include a phenyl group and a naphthyl group.

Examples of the unsubstituted heterocyclic group in R include a heterocyclic group that has 5 to 18 carbon atoms. Specific examples of the heterocyclic group that has 5 to 18 carbon atoms include oxygen atom-containing heterocyclic groups such as a γ-butyrolactone group and ε-caprolactone group, nitrogen atom-containing heterocyclic groups such as a pyridyl group, a carbazolyl group, a pyrrolidinyl group, and a pyrrolidonyl group, and a morpholino group.

Examples of a substituent group (a substituent group in each of an alkyl group that has a substituent group, an alicyclic group that has a substituent group, an aryl group that has a substituent group, and a heterocyclic group that has a substituent group) in R include at least one kind selected from a group constituting of an alkyl group (except for a case in which R is an alkyl group that has a substituent group), an aryl group, —COOR$^{11}$, a cyano group, —OR$^{12}$, —NR$^{13}$R$^{14}$, —CONR$^{15}$R$^{16}$, a halogen atom, an allyl group, an epoxy group, a siloxy group, and a hydrophilic or ionic group.

Here, R$^{11}$ to R$^{16}$ each independently represent a hydrogen atom, an unsubstituted alkyl group or an alkyl group that has a substituent group, an unsubstituted alicyclic group or an alicyclic group that has a substituent group, or an unsubstituted aryl group or an aryl group that has a substituent group. As each of these groups, groups similar to those described above are exemplified.

As each of the alkyl group and the aryl group in the aforementioned substituent group, unsubstituted alkyl groups that are similar to those described above and unsubstituted aryl groups that are similar to those described above are exemplified.

As R$^{11}$ of —COOR$^{11}$ in the aforementioned substituent group, a hydrogen atom or an unsubstituted alkyl group is preferably used. That is, —COOR$^{11}$ is preferably a carboxy group or an alkoxycarbonyl group. Examples of the alkoxycarbonyl group include a methoxycarbonyl group.

As R$^{12}$ of —OR$^{12}$ in the aforementioned substituent group, a hydrogen atom or an unsubstituted alkyl group is preferably used. That is, —OR$^{12}$ is preferably a hydroxy group or an alkoxy group. Examples of the alkoxy group include an alkoxy group that has 1 to 12 carbon atoms, and specific examples thereof include a methoxy group.

Examples of —NR$^{13}$R$^{14}$ in the aforementioned substituent group include an amino group, a monomethylamino group, and a dimethylamino group.

Examples of —CONR$^{15}$R$^{16}$ in the aforementioned substituent group include a carbomoyl group (—CONH$_2$), an N-methylcarbamoyl group (—CONHCH$_3$), and an N,N-dimethylcarbamoyl group (dimethylamido group: —CON(CH$_3$)$_2$).

Examples of the halogen atom in the aforementioned substituent group include a fluorine atom, a chlorine atom, a bromine atom, and an iodine atom.

Examples of the hydrophilic or ionic group in the aforementioned substituent group include an alkali salt of a carboxy group or an alkali salt of a sulfoxy group, a poly(alkyleneoxide) group such as a polyethyleneoxide group or a polypopyleneoxide group, and a cationic substituent group such as a quaternary ammonium base.

As R, an unsubstituted alkyl group or an alkyl group that has a substituent group or an unsubstituted alicyclic group or an alicyclic group that has a substituent group is preferably used, and an unsubstituted alkyl group, an unsubstituted alicyclic group, or an alicyclic group that has an alkyl group as the substituent group is preferably used.

Among them, a methyl group, an ethyl group, an n-propyl group, an i-propyl group, an n-butyl group, an i-butyl group, a t-butyl group, a pentyl group, a hexyl group, a 2-ethylhexyl group, a heptyl group, and an octyl group are preferably used, and a methyl group, an ethyl group, an n-propyl group, an i-propyl group, an n-butyl group, an i-butyl group, a t-butyl group, a cyclopropyl group, a cyclobutyl group, an isobornyl group, and an adamantyl group are preferably used.

As the radical polymerizable group that the monomer (a1) has, a group that has an ethylenically unsaturated bond is preferably used similar to the radical polymerizable group that the macromonomer (a) has.

Although various monomers can be used as the monomer (a1), examples thereof include: hydrocarbon group-containing (meth)acrylic ester such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, isoamyl (meth)acrylate, hexyl (meth)acrylate, 2-ethylhexyl (meth)acrylate, octyl (meth)acrylate, lauryl (meth)acrylate, stearyl (meth)acrylate, isostearyl (meth)acrylate, hexadecyl (meth)acrylate, nonyl (meth)acrylate, isononyl (meth)acrylate, phenyl (meth)acrylate, benzyl (meth)acrylate, cyclohexyl (meth)acrylate, tetrahydrofurfuryl (meth)acrylate, isobornyl (meth)acrylate, 3,5,5-trimethylcyclohexyl (meth)acrylate, dicyclopentanyl (meth)acrylate, dicyclopentenyl (meth)acrylate, dicyclopentenyloxyethyl (meth)acrylate, terpene acrylate and derivatives thereof, hydrogenated rosin acrylate and derivatives thereof, and dococyl (meth)acrylate;

hydroxyl group-containing (meth)acrylic ester such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, and glycerol (meth)acrylate;

a carboxyl group-containing vinyl-based monomer such as a (meth)acrylic acid, a 2-(meth)acryloyloxyethylhexahydrophthalic acid, a 2-(meth)acryloyloxypropylhexahydrophthalic acid, a 2-(meth)acryloyloxyethylphthalic acid, a 2-(meth)acryloyoxypropylphthalic acid, a 2-(meth)acryloyoxyethylmaleic acid, a 2-(meth)acryloyoxypropylmaleic acid, a 2-(meth)acryloyoxyethylsuccinic acid, a 2-(meth)acryloyoxypropylsuccinic acid, a crotonic acid, a fumaric acid, a maleic acid, an itaconic acid, a citraconic acid, monomethyl maleate, monoethyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monoethyl citraconate;

an acid anhydride group-containing vinyl-based monomer such as maleic anhydride or itaconic anhydrate;

an unsaturated dicarboxylic acid diester monomer such as dimethyl maleate, dibutyl maleate, dimethyl fumarate, dibutyl fumarate, dibutyl itaconate, and diperfluorocyclohexyl fumarate;

epoxy group-containing vinyl-based monomer such as glycidyl (meth)acrylate, α-ethyl glycidyl acrylate, and (meth)acrylic acid 3,4-epoxybutyl;

amino group-containing (meth)acrylic ester-based vinyl-based monomers such as dimethylaminoethyl (meth)acrylate and diethylaminoethyl (meth)acrylate;

vinyl-based monomers containing an amide group such as (meth)acrylamide, N-t-butyl(meth)acrylamide, N-methylol(meth)acrylamide, N-isopropylacrylamide, hydroxyethylacrylamide, N-methoxymethyl(meth)acrylamide, N-butoxymethyl(meth)acrylamide, diacetoneacrylamide, maleic acid amide, and maleimide;

vinyl-based monomers such as styrene, α-methylstyrene, vinyltoluene, (meth)acrylonitrile, vinyl chloride, vinyl acetate, and vinyl propionate;

polyfunctional vinyl-based monomers such as divinylbenzene, ethylene glycol di(meth)acrylate, 1,3-butylene glycol di(meth)acrylate, 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, polyethylene glycol di(meth)acrylate, tripropylene glycol di(meth)acrylate, neopentyl glycol di(meth)acrylate, 1,9-nonanediol di(meth)acrylate, 1,10-decanediol di(meth)acrylate, trimethylolpropane tri(meth)acrylate, pentaerythritol tetra(meth)acrylate, dipentaerythritol hexa(meth)acrylate, allyl(meth)acrylate, triallyl cyanurate, diallyl maleate, polypropylene glycol diallyl ether, and N,N'-methylene bis(meth)acrylamide;

silane coupling agent-containing monomers such as acryloylmorpholine, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, etoxyethoxyethyl (meth)acrylate, phenoxyethyl (meth)acrylate, nonylphenoxyethyl (meth)acrylate, 3-methoxybutyl (meth)acrylate, acetoxyethyl (meth)acrylate, "Plaxel FM" (caprolactone-added monomer manufactured by Daicel Corporation, product name), "Blemmer PME-100" (methoxypolyethylene glycol methacrylate (the number of chains of ethylene glycol is 2) manufactured by NOF Corporation, product name), "Blemmer PME-200" (methoxypolyethylene glycol methacrylate (the number of chains of ethylene glycol is 4) manufactured by NOF Corporation, product name), "Blemmer PME-400" (methoxypolyethylene glycol methacrylate (the number of chains of ethylene glycol is 9) manufactured by NOF Corporation, product name), "Blemmer 50POEP-800B" (octoxypolyethylene glycol-polypropylene glycol-methacrylate (the number of chains of ethylene glycol is 8, and the number of chains of propylene glycol is 6) manufactured by NOF Corporation, product name) and "Blemmber 20ANEP-600" (nonylphenoxy (ethylene glycol-polypropylene glycol) monoacrylate manufactured by NOF Corporation, product name), "Blemmer AME-100" (manufactured by NOF Corporation, product name), "Blemmer AME-200" (manufactured by NOF Corporation, product name) and "Blemmer 50AOEP-800B" (manufactured by NOF Corporation, product name), Silaplane FM-0711 (manufactured by JNC Corporation, product name), Silaplane FM-0721 (manufactured by JNC Corporation, product name), Silaplane FM-0725 (manufactured by JNC Corporation, product name), Silaplane TM-0701 (manufactured by JNC Corporation, product name), Silaplane TM-0701T (manufactured by JNC Corporation, product name), X-22-174DX (manufactured by Shin-Etsu Chemical Co., Ltd., product name), X-22-2426 (manufactured by Shin-Etsu Chemical Co., Ltd., product name), X-22-2475 (manufactured by Shin-Etsu Chemical Co., Ltd., product name), 3-(meth)acryloxypropyltrimethoxysilane, 3-(meth)acryloxypropylmethyldiethoxysilane, 3-(meth)acryloxypropyltriethoxysilane, 3-acryloxypropyltrimethoxysilane, vinyltrimethoxysilane, and vinyltriethoxysilane;

organosilyl group-containing monomers other than the silane coupling agent-containing monomers, such as trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyldi-n-butylsilyl (meth)acrylate, diisopropylstearylsilyl (meth)acrylate, dicyclohexylphenylsilyl (meth)acrylate, t-butyldiphenylsilyl (meth)acrylate, lauryl diphenylsilyl (meth)acrylate, triisopropylsilylmethyl maleate, triisopropylsilylamyl maleate, tri-n-butylsilyl-n-butyl maleate, t-butyldiphenylsilylmethyl maleate, t-butyldiphenylsilyl-n-butyl maleate, triisopropylsilylmethyl fumarate, triisopropylsilyl-lamyl fumarate, tri-n-butylsilyl-n-butyl fumarate, t-butyldiphenylsilylmethyl fumarate, and t-butyldiphenylsilyl-n-butyl fumarate; and halogenated olefin such as vinyl chloride, vinylidene chloride, vinyl fluoride, vinylidene fluoride, and chlorotrifluoroethylene, fluorine-containing monomers (except for halogenated olefin) such as 2-isocyanatoethyl-2,2,2-trifluoroethyl (meth)acrylate, 2,2,3,3,3-pentafluorophenyl (meth)acrylate, 2-(perfluorobutyl)ethyl (meth)acrylate, 3-(perfluorobutyl)-2-hydroxypropyl (meth)acrylate, 2-(perfluorohexyl)ethyl (meth)acrylate, 3-perfluorohexyl-2-hydroxypropyl (meth)acrylate, 3-(perfluoro-3-methylbutyl)-2-hydroxypropyl(meth)acrylate, 2,2,3,3-tetrafluoropropyl (meth)acrylate, 1H,1H,5H-octafluoropentyl (meth)acrylate, 1H,1H,5H-octafluoropentyl (meth)acrylate, 1H,1H,2H,2H-tridecafluorooctyl (meth)acrylate, 1H-1-(trifluoromethyl)trifluoroethyl (meth)acrylate, 1H,1H,3H-hexafluorobutyl (meth)acrylate, and 1,2,2,2-tetrafluoro-1-(trifluoromethyl) ethyl(meth)acrylate, monomers with an acetal structure such as 1-butoxyethyl (meth)acrylate, 1-(2-ethylhexyloxy)ethyl (meth)acrylate, 1-(cyclohexyloxy)ethyl (meth)acrylate, and 2-tetrahydropyranyl (meth)acrylate, 4-methacryloyloxybenzophenone, and (meth)acrylic acid-2-isocyanatoethyl. One kind of these monomers may be used alone, or two or more kinds thereof may be used.

At least a part of the monomer (a1) is preferably a (meth)acrylic monomer.

In a case in which the constituent unit derived from the vinyl monomer (b) does not include a constituent unit that has a hydroxyl group, the constituent unit derived from the macromonomer (a) includes a constituent unit that has a hydroxyl group. That is, the monomer (a1) includes a monomer that has a hydroxyl group.

As the monomer that has a hydroxyl group, monomers that are similar to those as described above are exemplified.

In a case in which the constituent unit derived from the vinyl monomer (b) includes a constituent unit that has a hydroxyl group, the monomer (a1) may or may not include a monomer that has a hydroxyl group.

As the constituent unit derived from the monomer (a1), a constituent unit represented by the following formula (a') (hereinafter, also referred to as a "constituent unit (a')") is preferably used.

[Chem. 2]

(a')

In the formula, $R^1$ represents a hydrogen atom, a methyl group, or $CH_2OH$, $R^2$ represents $OR^3$, a halogen atom, $COR^4$, $COOR^5$, $CN$, $CONR^6R^7$, or $R^8$, $R^3$ to $R^7$ each independently represent a hydrogen atom, an unsubstituted alkyl group or an alkyl group that has a substituent group, an unsubstituted alicyclic group or an alicyclic group that has a substituent group, an unsubstituted aryl group or an aryl group that has a substituent group, an unsubstituted heteroaryl group or a heteroaryl group that has a substituent group, an unsubstituted nonaromatic heterocyclic group or a nonaromatic heterocyclic group that has a substituent group, an unsubstituted aralkyl group or an aralkyl group that has a substituent group, an unsubstituted alkaryl group or an alkaryl group that has a substituent group, or an unsubstituted organosilyl group or an organosilyl group that has a substituent group, each of the substituent groups of these groups is at least one kind selected from a group consisting of a carboxylic acid group (COOH), a carboxylic acid ester group, an epoxy group, a hydroxy group, an alkoxy group, a primary amino group, a secondary amino group, a tertiary amino group, an isocyanato group, a sulfonic acid group ($SO_3H$), and a halogen atom, $R^8$ represents an unsubstituted aryl group or an aryl group that has a substituent group or an unsubstituted heteroaryl group or a heteroaryl group that has a substituent group, and each of the substituent groups of these groups is at least one kind selected from a group consisting of a carboxylic acid group, a carboxylic acid ester group, an epoxy group, a hydroxy group, an alkoxy group, a primary amino group, a secondary amino group, a tertiary amino group, an isocyanato group, a sulfonic acid group, an unsubstituted alkyl group or an alkyl group that has a substituent group, an unsubstituted aryl group or an aryl group that has a substituent group, an unsubstituted olefin group or an olefin group that has a substituent group, and a halogen atom.

As each of the unsubstituted alkyl group, the unsubstituted alicyclic group, and the unsubstituted aryl group in $R^3$ to $R^7$, unsubstituted alkyl groups, unsubstituted alicyclic groups, and unsubstituted aryl groups that are similar to those in R as described above are exemplified.

Examples of the unsubstituted heteroaryl group include a pyridyl group and a carbazolyl group.

Examples of the unsubstituted nonaromatic heterocyclic group include a pyrrolidinyl group and a pyrrolidonyl group.

Examples of the unsubstituted aralkyl group include a benzyl group and a phenylethyl group.

Examples of the unsubstituted organosilyl group include —$SiR^{17}R^{18}R^{19}$ (here, $R^{17}$ to $R^{19}$ each independently represent an unsubstituted alkyl group or an alkyl group that has a substituent group, an unsubstituted alicyclic group or an alicyclic group that has a substituent group, or an unsubstituted aryl group or an aryl group that has a substituent group).

As the unsubstituted alkyl group or the alkyl group that has a substituent group in $R^{17}$ to $R^{19}$, groups that are similar to those described above are exemplified, and examples thereof include a methyl group, an ethyl group, an n-propyl group, an n-butyl group, an n-amyl group, an n-hexyl group, an n-octyl group, an n-dodecyl group, a stearyl group, a lauryl group, an isopropyl group, an isobutyl group, an s-butyl group, a 2-methylisopropyl group, and a benzyl group. As the unsubstituted alicyclic group or the alicyclic group that has a substituent group, groups that are similar to those described above are exemplified, and examples thereof include a cyclohexyl group. As the unsubstituted aryl group or the aryl group that has a substituent group, groups that are similar to those described above are exemplified, and examples thereof include a phenyl group and a p-methylphenyl. $R^{17}$ to $R^{19}$ may be the same or different from each other.

Among the substituent groups (substituent groups in each of an alkyl group that has a substituent group, an alicyclic group that has a substituent group, an aryl group that has a substituent group, a heteroaryl group that has a substituent group, a nonaromatic heterocyclic group that has a substituent group, an aralkyl group that has a substituent group, an alkaryl group that has a substituent group, and an organosilyl group that has a substituent group) in $R^3$ to $R^7$, examples of the carboxylic acid ester group include a group in which $R^{11}$ in —$COOR^{11}$ described above is an unsubstituted alkyl group or an alkyl group that has a substituent group, an unsubstituted alicyclic group or an alicyclic group that has a substituent group, or an unsubstituted aryl group or an aryl group that has a substituent group.

Examples of the alkoxy group include a group in which $R^{12}$ in —$OR^{12}$ described above is an unsubstituted alkyl group.

Examples of the secondary amino group include a group in which $R^{13}$ in —$NR^{13}R^{14}$ described above is a hydrogen atom and $R^{14}$ is an unsubstituted alkyl group or an alkyl group that has a substituent group, an unsubstituted alicyclic group or an alicyclic group that has a substituent group, or an unsubstituted aryl group or an aryl group that has a substituent group.

Examples of the tertiary amino group include a group in which each of $R^{13}$ and $R^{14}$ in —$NR^{13}R^{14}$ described above is an unsubstituted alkyl group or an alkyl group that has a substituent group, an unsubstituted alicyclic group or an alicyclic group that has a substituent group, or an unsubstituted aryl group or an aryl group that has a substituent group.

As each of the unsubstituted alkyl group or the alkyl group that has a substituent group, the unsubstituted aryl group or the aryl group that has a substituent group, or the halogen atom, atoms and groups that are similar to those described above are exemplified.

As each of the unsubstituted aryl group and the unsubstituted heteroaryl group in $R^8$, groups that are similar to those described above are exemplified.

As each of the carboxylic acid ester group, the alkoxy group, the primary amino group, the secondary amino group, the tertiary amino group, the unsubstituted alkyl group or the alkyl group that has a substituent group, the unsubstituted aryl group or the aryl group that has a substituent group, and the halogen atom among the substituent groups in $R^8$ (a substituent group in each of the aryl group that has a substituent group and a heteroaryl group that has a substituent group), atoms and groups that are similar to those described above are exemplified.

Examples of the unsubstituted olefin group include an allyl group.

As a substituent group in the olefin group that has a substituent group, substituent groups that are similar to those in $R^8$ are exemplified.

The constituent unit (a') is a constituent unit derived from $CH_2=CR^1R^2$. As specific examples of $CH_2=CR^1R^2$, the following substances are exemplified:

hydrophobic group-containing (meth)acrylic ester monomers such as substituted or unsubstituted alkyl (meth)acrylate [for example, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, behenyl (meth)acrylate, 1-methyl-2-methoxyethyl (meth)acrylate, 3-methoxybutyl (meth)acrylate, 3-methyl-3-methoxybutyl (meth)acrylate], substituted or unsubstituted aralkyl (meth)acrylate [for example, benzyl (meth)acrylate, m-methoxyphenylethyl (meth)acrylate, p-methoxyphenylethyl (meth)acrylate], substituted or unsubstituted aryl (meth)acrylate [for example, phenyl (meth)acrylate, m-methoxyphenyl (meth)acrylate, p-methoxyphenyl (meth)acrylate, o-methoxyphenylethyl (meth)acrylate], alicyclic (meth)acrylate [for example, isobornyl (meth)acrylate and cyclohexyl (meth)acrylate], and halogen atom-containing (meth)acrylate [for example, trifluoroethyl (meth)acrylate, perfluorooctyl (meth)acrylate, and perfluorocyclohexyl (meth)acrylate];

oxyethylene group-containing (meth)acrylic ester monomers such as 2-methoxyethyl (meth)acrylate, 2-ethoxyethyl (meth)acrylate, 2-butoxyethyl (meth)acrylate, butoxydiethylene glycol (meth)acrylate, methoxytriethylene glycol (meth)acrylate, methoxypolyethylene glycol (meth)acrylate, phenoxyethyl (meth)acrylate, and 2-(2-ethylhexoxy)ethyl (meth)acrylate;

hydroxyl group-containing (meth)acrylic ester monomers such as 2-hydroxyethyl (meth)acrylate, 2-hydroxypropyl (meth)acrylate, 4-hydroxybutyl (meth)acrylate, and glyceol (meth)acrylate;

terminal alkoxyallylated polyether monomers such as methoxypolyethylene glycol allyl ether, methoxypolypropylene glycol allyl ether, butoxypolyethylene glycol allyl ether, butoxypolypropylene glycol allyl ether, methoxypolyethylene glycol-polypropylene glycol allyl ether, and butoxypolyethylene glycol-polypropylene glycol allyl ether;

epoxy group-containing vinyl monomer such as glycidyl (meth)acrylate, α-ethyl glycidyl acrylate, and (meth)acrylic acid 3,4-epoxybutyl;

primary or secondary amino group-containing vinyl monomers such as butylaminoethyl (meth)acrylate and (meth)acrylamide;

tertiary amino group-containing vinyl monomer such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylamide, and dimethylaminopropyl (meth)acrylate;

heterocyclic-based basic monomers such as vinylpyrrolidone, vinylpyridine, and vinylcarbazole;

organosilyl group-containing vinyl monomers such as trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyldi-n-butylsilyl (meth)acrylate, diisopropylstearylsilyl (meth)acrylate, dicyclohexylphenylsilyl (meth)acrylate, t-butyldiphenylsilyl (meth)acrylate, and lauryl diphenylsilyl (meth)acrylate;

carboxy group-containing ethylenic unsaturated monomer such as a methacrylic acid, an acrylic acid, vinyl benzoate, tetrahydrophthalic acid monohydroxyethyl (meth)acrylate, tetrahydrophthalic acid monohydroxypropyl (meth)acrylate, tetrahydrophthalic acid monohydroxybutyl (meth)acrylate, phthalic acid monohydroxyethyl (meth)acrylate, phthalic acid monohydroxypropyl (meth)acrylate, succinic acid monohydroxyethyl (meth)acrylate, succinic acid monohydroxypropyl (meth)acrylate, maleic acid monohydroxyethyl (meth)acrylate, and maleic acid monohydroxypropyl (meth)acrylate;

cyano group-containing vinyl monomers such as acrylonitrile and methacrylonitrile;

vinyl ether monomer such as alkyl vinyl ether [for example, ethyl vinyl ether, propyl vinyl ether, butyl vinyl ether, hexyl vinyl ether, and 2-ethylhexyl vinyl ether], and cycloalkyl vinyl ether [for example, cyclohexyl vinyl ether];

vinyl ester monomers such as vinyl acetate, vinyl propionate, vinyl butylate, and vinyl benzoate; aromatic vinyl monomers such as styrene, vinyl toluene, and α-methylstyrene; and halogenated olefin such as vinyl chloride and vinyl fluoride.

The macromonomer (a) may further have constituent units other than the constituent unit (a'). Examples of other constituent units include a constituent unit derived from a monomer that does not correspond to $CH_2=CR^1R^2$ in the aforementioned monomers (a1), for example.

Preferable specific examples of other constituent units include constituent units derived from the following monomers:

organosilyl group-containing vinyl monomer such as triisopropylsilylmethyl maleate, triisopropylsilylamyl maleate, tri-n-butylsilyl-n-butylmaleate, t-butyldiphenylsilylmethyl maleate, t-butyldiphenylsilyl-n-butylmaleate, triisopropylsilylmethyl fumarate, triisopropylsilylamyl fumarate, tri-n-butylsilyl-n-butylfumarate, t-butyldiphenylsilylmethyl fumarate, and t-butyldiphenylsilyl-n-butylfumarate;

acid anhydride group-containing vinyl monomers such as maleic anhydride and itaconic anhydride;

carboxy group-containing ethylenic unsaturated monomers such as a crotonic acid, a fumaric acid, an itaconic acid, a maleic acid, a citraconic acid, monomethyl maleate, monoethyl maleate, monobutyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monoethyl citraconate;

unsaturated dicarboxylic acid diester monomers such as dimethyl maleate, dibutyl maleate, dimethyl fumarate, dibutyl fumarate, dibutyl itaconate, and diperfluorocyclohexyl fumarate;

halogenated olefin such as vinylidene chloride, vinylidene fluoride, and chlorotrifluoroethylene;

polyfunctional monomers such as ethylene glycol di(meth)acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, trimethylolpropane tri(meth)acrylate, pentaerythritol tetra (meth)acrylate, dipentaerythritol hexa(meth)acrylate, allyl methacrylate, triallyl cyanurate, diallyl maleate, and polypropylene glycol diallyl ether; and monomers obtained from an esterification reaction between an epoxy group-containing unsaturated monomer and a carboxyl group-containing monomer.

As the macromonomer (a), a macromonomer with a radical polymerizable group introduced to a terminal of a main chain that includes two or more constituent units (a') is preferably used, and a macromonomer represented by the following formula (1) is more preferably used.

[Chem. 3]

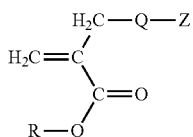

(1)

(In the formula, R represents a hydrogen atom, an unsubstituted alkyl group or an alkyl group that has a substituent group, an unsubstituted cycloalkyl group or a cycloalkyl group that has a substituent group, an unsubstituted aryl group or an aryl group that has a substituent group, or an unsubstituted heterocyclic group or a heterocyclic group that has a substituent group, Q represents a main chain part including two or more constituent units (a'), and Z represents a terminal group.)

In the formula (1), R is similar to R in CH$_2$=C(COOR)—CH$_2$—, and preferable aspects are also similar to those of R in CH$_2$=C(COOR)—CH$_2$—.

2 or more constituent units (a') included in Q may be the same or different from each other.

Q may be configured only of the constituent units (a') or may further include a constituent unit other than the constituent units (a').

The number of constituent units that configure Q can be appropriately set within a range in which the number average molecular weight of the macromonomer (a) falls within the aforementioned range.

Examples of Z include a hydrogen atom, a group derived from a radical polymerization initiator, and a radical polymerizable group similarly to a terminal group of a polymer obtained through known radical polymerization, for example.

As the macromonomer (a), a macromonomer represented by the following formula (2) is particularly preferably used.

[Chem. 4]

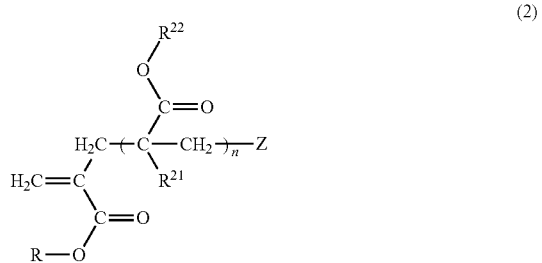

(2)

(In the formula, R represents a hydrogen atom, an unsubstituted alkyl group or an alkyl group that has a substituent group, an unsubstituted cycloalkyl group or a cycloalkyl group that has a substituent group, an unsubstituted aryl group or an aryl group that has a substituent group, or an unsubstituted heterocyclic group or a heterocyclic group that has a substituent group, R$^{21}$ represents a hydrogen atom or a methyl group, R$^{22}$ represents an unsubstituted alkyl group or an alkyl group that has a substituent group, an unsubstituted alicyclic group or an alicyclic group that has a substituent group, an unsubstituted aryl group or an aryl group that has a substituent group, or an unsubstituted heteroaryl group or a heteroaryl group that has a substituent group, an unsubstituted aralkyl group or an aralkyl group that has a substituent group, an unsubstituted alkaryl group or an alkaryl group that has a substituent group, or an unsubstituted organosilyl group or an organosilyl group that has a substituent group, and each of the substituent groups in these groups is at least one kind selected from a carboxylic acid group, a carboxylic acid ester group, an epoxy group, a hydroxy group, an alkoxy group, a primary amino group, a secondary amino group, a tertiary amino group, an isocyanato group, a sulfonic acid group, and a halogen atom, n is a natural number that is equal to or greater than 2, and Z represents a terminal group.)

In the formula (2), each of R and Z is similar to that described above.

Each group in R$^{22}$ is similar to those exemplified for R$^5$ in COOR$^5$.

n is a natural number that is equal to or greater than 2. n preferably falls within a range in which the number average molecular weight (Mn) of the macromonomer (a) is equal to or greater than 500 and equal to or less than 100 thousands. R$^{21}$ and R$^{22}$ may be the same or different from each other.

The number average molecular weight (Mn) of the macromonomer (a) is preferably equal to or greater than 500 and equal to or less than 100000, is more preferably equal to or greater than 800 and equal to or less than 30000, is further preferably equal to or greater than 900 and equal to or less than 10000, and is particularly preferably equal to or greater than 1000 and equal to or less than 5500. If the number average molecular weight of the macromonomer (a) is equal to or greater than the lower limit value of the aforementioned range, more excellent hardness and water resistance of the coating film are achieved. If the number average molecular weight of the macromonomer (a) is equal to or less than the upper limit value of the aforementioned range, more excellent preservation stability of a solution of the copolymer (A) and a coating material composition including the same is achieved.

The number average molecular weight of the macromonomer (a) is measured by a gel permeation chromatography (GPC) by using polystyrene as a reference resin.

The glass transition temperature of the macromonomer (a) (hereinafter, also referred to as "Tga") is preferably equal to or greater than 0° C. and equal to or less than 150° C., is more preferably equal to or greater than 10° C. and equal to or less than 120° C., and is further preferably equal to or greater than 30° C. and equal to or less than 100° C. If Tga is equal to or greater than the lower limit value of the aforementioned range, more excellent hardness and water resistance of the coating film are achieved. If Tga is equal to or less than the upper limit value of the aforementioned range, more excellent preservation stability of a solution of the copolymer (A) and a coating material composition including the same is achieved, and it becomes easy to obtain low viscosity of the solution and the coating material composition even at high solid content.

Tga can be measured by a differential scanning calorimeter (DSC).

Tga can be controlled by a composition or the like of a monomer that forms the macromonomer (a).

As the macromonomer (a), a macromonomer that is manufactured by a known method or a commercially available monomer may be used.

As a method of manufacturing the macromonomer (a), a manufacturing method using a cobalt chain-transfer agent, a method using an α-substituted unsaturated compound such as α-methylstyrene dimer as a chain-transfer agent, a method of chemically bonding a radical polymerizable group to a polymer, a method using thermal decomposition, and the like are exemplified.

Among them, a manufacturing method using a cobalt chain-transfer agent is preferably used in terms of a small number of manufacturing processes and utilization of a catalyst with a high chain-transfer constant. Note that the macromonomer (a) in a case in which the macromonomer (a) is manufactured by the cobalt chain-transfer agent has a structure represented by the aforementioned formula (1).

Examples of a method of manufacturing the macromonomer (a) using the cobalt chain-transfer agent include a bulk polymerization method, a solution polymerization method, and water-based dispersion polymerization methods such as a suspension polymerization method, and an emulsion polymerization method. Such water-based dispersion polymerization methods are preferably used in terms of simple collection processes.

As a method of chemically bonding the radical polymerization group to the polymer, a manufacturing method of substituting a halogen group in a polymer that has the halogen group with a compound that has a radical polymerizable carbon-carbon double bond, a method of causing a reaction between a vinyl-based monomer that has an acid group and a vinyl-based polymer that has an epoxy group, a method of causing a reaction between a vinyl-based polymer that has an epoxy group and a vinyl-based monomer that has an acid group, a method of causing a reaction between a vinyl-based polymer that has a hydroxyl group and a diisocyanate compound to obtain a vinyl-based polymer that has an isocyanate group and causing a reaction between the vinyl-based polymer and a vinyl-based monomer that has a hydroxyl group, and the like are exemplified, and the macromonomer (a) may be manufactured by any of the methods.

The number average molecular weight of the macromonomer (a) can be controlled by a polymerization initiator, a chain-transfer agent, or the like.

<Constituent Unit Derived from Vinyl Monomer (b)>

The vinyl monomer (b) is a monomer that has an ethylenically unsaturated bond and that is not a macromonomer. The vinyl monomer (b) is not particularly limited, and monomers similar to those for obtaining the macromonomer (a) as exemplified above can be used. Any one kind of these vinyl monomers may be used alone, or two or more kinds thereof may be used in combination.

The vinyl monomer (b) preferably includes at least one kind of monomer selected from a group consisting of 2-ethylhexyl (meth)acrylate, n-butyl (meth)acrylate, isobutyl (meth)acrylate, styrene, and isobornyl (meth)acrylate (hereinafter, also referred to as a "monomer (b1)"). If the copolymer (A) includes a constituent unit derived from the monomer (b1), more excellent weather resistance, water resistance, glossiness, and the like of the coating film are achieved.

In a case in which the constituent unit derived from the macromonomer (a) does not include a constituent unit that has a hydroxyl group, the constituent unit derived from the vinyl monomer (b) includes a constituent unit that has a hydroxyl group. That is, the vinyl monomer (b) includes a vinyl monomer that has a hydroxyl group (hereinafter, also referred to as a "monomer (b2)").

As the monomer (b2), monomers that are similar to those that has a hydroxyl group as exemplified above are exemplified, and preferable aspects are also similarly applied.

In a case in which the constituent unit derived from the macromonomer (a) includes a constituent unit that has a hydroxyl group, the vinyl monomer (b) may or may not be the monomer (b2).

The vinyl monomer (b) may further include a vinyl monomer other than the monomers (b1) and (b2). As another vinyl monomer, monomers that are similar to those for obtaining the macromonomer (a) as exemplified above can be used.

<Constituent Unit that has Hydroxyl Group>

In the copolymer (A), the content of the constituent unit that has a hydroxyl group is preferably equal to or greater than 0.5 parts by mass and equal to or less than 80 parts by mass, is more preferably equal to or greater than 5 parts by mass and equal to or less than 60 parts by mass, and is further preferably equal to or greater than 10 parts by mass and equal to or less than 50 parts by mass with respect to the total mass of all the constituent units. If the content of the constituent unit that has a hydroxyl group is equal to or greater than the lower limit value of the aforementioned range, crosslinking density becomes sufficiently high and hardness of the coating film further increases when the copolymer (A) is cured with a curing agent or the like. If the content of the constituent unit that has a hydroxyl group is equal to or less than the upper limit value of the aforementioned range, more excellent water resistance is achieved.

The content of the constituent unit that contains a hydroxyl group in the copolymer (A) is a total amount of the content of a constituent unit that contains a hydroxyl group in the constituent unit derived from the macromonomer (a) and the content of a constituent unit that contains a hydroxyl group (the constituent unit derived from the monomer (b2)) in the constituent unit derived from the vinyl monomer (b) (including a case in which the content of the constituent unit that contains a hydroxyl group in the constituent unit derived from the macromonomer (a) or the constituent unit derived from the vinyl monomer (b) is 0% by mass).

The constituent unit that has a hydroxyl group preferably includes a constituent unit that has any one of or both a secondary hydroxyl group and a tertiary hydroxyl group (hereinafter, also referred to as a "secondary/tertiary OH-containing unit"). It is possible to efficiently perform a repair operation through curing delay by including the secondary/tertiary OH-containing unit. The secondary/tertiary OH-containing unit may further have a primary hydroxyl group.

Examples of the secondary/tertiary OH-containing unit include a constituent unit derived from a monomer that has any one of or both a secondary hydroxyl group and a tertiary hydroxyl group (hereinafter, also referred to as a "secondary/tertiary OH-containing monomer").

As the secondary/tertiary OH-containing monomer, a vinyl monomer that has any one of or both a secondary hydroxyl group and a tertiary hydroxyl group is preferably used. The secondary/tertiary OH-containing monomer may be a monovalent alcohol monomer that has one hydroxyl group or may be a polyvalent alcohol monomer that has two or more hydroxyl groups. The monovalent alcohol monomer may be a secondary alcohol monomer in which the hydroxyl group is a secondary hydroxyl group or may be a tertiary alcohol monomer in which the hydroxyl group is a tertiary hydroxyl group.

Examples of the secondary alcohol monomer include: monohydroxyalkyl (meth)acrylate that has a secondary hydroxyl group such as 2-hydroxypropyl (meth)acrylate, 2-hydroxybutyl (meth)acrylate, and 3-hydroxybutyl (meth)acrylate; and polyalkylene glycol mono(meth)acrylate that has a secondary hydroxyl group such as polypropylene glycol (meth)acrylate.

Examples of the tertiary alcohol monomer includes: 3-hydroxy-1,3-diethylbutane (meth)acrylate, 3-hydroxy-1-adamantyl (meth)acrylate, 2-hydroxy-2-methylpropyl (meth)acrylate, and 2-hydroxy-1,2-dimethylpropyl (meth)acrylate.

Examples of the polyvalent alcohol monomer include polyvalent hydroxyalkyl (meth)acrylate that has a secondary hydroxyl group such as glycerol mono(meth)acrylate.

One kind of these monomers may be used alone, or two or more kinds thereof may be used in combination.

As the secondary/tertiary OH-containing monomer, monohydroxyalkyl (meth)acrylate in which the hydroxyl group is a secondary hydroxyl group is preferably used, and 2-hydroxypropyl (meth)acrylate is particularly preferably used in terms of easy access.

As for the content of the constituent unit that has a primary hydroxyl group (hereinafter, also referred to as a "primary OH-containing unit") among the constituent units that have hydroxyl groups, the content of the constituent unit that has the primary hydroxyl group in the (meth)acrylic copolymer is equal to or less than 30 parts by mass with respect to 100 parts by mass of the constituent unit derived from the macromonomer (a) and the constituent unit derived from the vinyl monomer (b). It is possible to control the ratio of the secondary hydroxyl group, the tertiary hydroxyl group, and the primary hydroxyl group by the primary OH-containing unit and to control the gel fraction of one day after coating.

Examples of the primary OH-containing unit include a constituent unit derived from a monomer that has a primary hydroxyl group and that does not have a secondary hydroxyl group and the tertiary hydroxyl group (hereinafter, also referred to as a "primary OH-containing monomer").

As the primary OH-containing monomer, a vinyl monomer that has a primary hydroxyl group and that does not have a secondary hydroxyl group and a tertiary hydroxyl group is preferably used, and examples thereof include monohydroxyalkyl (meth)acrylate that has a primary hydroxyl group such as 2-hydroxyethyl (meth)acrylate and 4-hydroxybutyl (meth)acrylate; and polyalkylene glycol mono(meth)acrylate that has a primary hydroxyl group such as polyethylene glycol (meth)acrylate. One kind of these monomers may be used alone, or two or more kinds thereof may be used in combination.

As the primary OH-containing monomer, monohydroxyalkyl (meth)acrylate that has a primary hydroxyl group is preferably used, and 2-hydroxyethyl (meth)acrylate, 3-hydroxypropyl (meth)acrylate, and 4-hydroxybutyl (meth)acrylate are particularly preferably used.

As for the unit that has a primary hydroxyl group, the content of the constituent unit that has a primary hydroxyl group in the (meth)acrylic copolymer is equal to or less than 30 parts by mass, is more preferably equal to or less than 20 parts by mass, and is further preferably equal to or less than 10 parts by mass with respect to 100 parts by mass of the constituent unit derived from the macromonomer (a) and the constituent unit derived from the vinyl monomer (b). If the content is equal to or less than 30 parts by mass, it becomes easy to perform a repair operation of the formed coating film.

The content of the secondary/tertiary OH-containing unit in the constituent unit that has a hydroxyl group is preferably equal to or greater than 20% by mass and equal to or less than 100% by mass, is more preferably equal to or greater than 30% by mass and equal to or less than 100% by mass, and is further preferably equal to or greater than 50% by mass and equal to or less than 95% by mass with respect to the total mass of the constituent unit that has a hydroxyl group. If the content of the secondary/tertiary OH-containing unit is equal to or greater than the lower limit value of the aforementioned range, it becomes easy to perform a repair operation of the formed coating film.

<Content of Each Constituent Unit>

The content of the constituent unit derived from the macromonomer (a) in the copolymer (A) is preferably equal to or greater than 7% by mass and equal to or less than 60% by mass, is more preferably equal to or greater than 8% by mass and equal to or less than 50% by mass, and is further preferably equal to or greater than 10% by mass and equal to or less than 40% by mass with respect to the total mass (100% by mass) of all the constituent units. If the content of the constituent unit derived from the macromonomer (a) is equal to or greater than the lower limit value of the aforementioned range, more excellent hardness is achieved. If the content of the constituent unit derived from the macromonomer (a) is equal to or less than the upper limit value of the aforementioned range, more excellent coating properties of a solution of the copolymer (A) and a coating material composition including the same are achieved.

The content of the constituent unit derived from the vinyl monomer (b) in the copolymer (A) is preferably equal to or greater than 40% by mass and equal to or less than 93% by mass, is more preferably equal to or greater than 50% by mass and equal to or less than 92% by mass, and is further preferably equal to or greater than 60% by mass and equal to or less than 90% by mass with respect to the total mass (100% by mass) of all the constituent unit. If the content of the constituent unit derived from the vinyl monomer (b) is equal to or greater than the lower limit value of the aforementioned range, more excellent coating properties of a solution of the copolymer (A) and a coating material composition including the same are achieved. If the content of the constituent unit derived from the vinyl monomer (b) is equal to or less than the upper limit value of the aforementioned range, more excellent coating film hardness is achieved.

The composition of the monomer that configures the macromonomer (a) and the composition of the monomer that configures the vinyl monomer (b) in the copolymer (A) are preferably different from each other. The compositions represent types and content ratios of monomers.

The weight average molecular weight (Mw) of the copolymer (A) is preferably equal to or greater than 2000 and equal to or less than 100000, is more preferably equal to or greater than 2500 and equal to or less than 40000, and is further preferably equal to or greater than 3000 and equal to or less than 20000. If the weight average molecular weight of the copolymer (A) is equal to or less than the upper limit value of the aforementioned range, the viscosity of a solution obtained by dissolving the copolymer (A) in a solvent decreases, and it becomes easy to obtain a high-solid-content and low-viscosity coating material composition. If the weight average molecular weight is equal to or greater than the lower limit value of the aforementioned range, more excellent hardness, durability, and the like of the formed coating film are achieved.

The hydroxyl value of the copolymer (A) is equal to or greater than 120 mgKOH/g and equal to or less than 260 mgKOH/g, is more preferably equal to or greater than 150 mgKOH/g and equal to or less than 230 mgKOH/g, and is particularly preferably equal to or greater than 150 mgKOH/g and equal to or less than 200 mgKOH/g. If the hydroxyl value of the copolymer (A) is equal to or greater than the lower limit value of the aforementioned range, crosslinking density becomes sufficiently high, and strength of the coating film further increases when the curing agent is blended in the copolymer (A) and the copolymer (A) is cured. If the hydroxyl value of the copolymer (A) is equal to or less than the upper limit value of the aforementioned range, more excellent water resistance is achieved.

The hydroxyl value of the copolymer (A) is measured by the JIS K 1557-1 A method.

The acid value of the copolymer (A) is preferably equal to or greater than 0 mgKOH/g and equal to or less than 80 mgKOH/g, is more preferably equal to or greater than 0 mgKOH/g and equal to or less than 50 mgKOH/g, and is further preferably equal to or greater than 0 mgKOH/g and equal to or less than 30 mgKOH/g. If the acid value of the copolymer (A) is equal to or less than the upper limit value of the aforementioned range, more excellent water resistance is achieved.

The acid value of the copolymer (A) is measured by the following measurement method.

About 0.5 g of sample is precisely weight in a beaker (A (g)), and 50 mL, of toluene/ethanol solution is added thereto. Several drops of phenolphthalein are added thereto, and measurement is performed through titration using a 0.5-normal KOH solution (titration amount=B (mL), titer of KOH solution=f). Blank measurement is similarly performed (titration amount=C (mL)), and the acid value is calculated in accordance with the following formula.

$$\text{Acid value (mgKOH/g)} = \{(B-C) \times 0.2 \times 56.11 \times f\}/A/\text{solid content}$$

The glass transition temperature (Tg) of the copolymer (A) is preferably equal to or greater than 0° C. and equal to or less than 100° C., and is further preferably equal to or greater than 10° C. and equal to or less than 50° C. The glass transition temperature (Tg) is particularly preferably equal to or greater than 20° C. and equal to or less than 40° C. If Tg of the copolymer (A) is equal to or greater than the lower limit of the aforementioned range, more excellent hardness of the coating film is achieved. If Tg of the copolymer (A) is equal to or less than the upper limit of the aforementioned range, more excellent cracking resistance is achieved.

Tg of the copolymer (A) means a value calculated by the Fox calculation formula from the glass transition temperature of a homopolymer of each monomer that configures the copolymer (A) and a mass fraction of each monomer (a proportion of a mass of each monomer with respect to a total mass when the total mass of all the monomers is assumed to be 1). The monomer that configures the macromonomer (a) and the vinyl monomer (b) are included in the monomers that configure the copolymer (A).

Note that the Fox calculation formula is a calculation value obtained by the following formula and can be obtained using a value described in Polymer HandBook, J. Brandrup, Interscience, 1989.

$$1/(273+Tg) = \Sigma(Wi/(273+Tgi))$$

(In the formula, Wi represents a mass fraction of a monomer i, and Tgi represents Tg (° C.) of a homopolymer of the monomer i.)

The glass transition temperature (Tga) (° C.) of the macromonomer (a) and the glass transition temperature (TgB) (° C.) of a polymer (B) obtained by polymerizing only the vinyl monomer (b) in the copolymer (A) preferably has a relationship of the following formula (3) since it is possible to efficiently exhibit the respective properties of the constituent unit derived from the macromonomer (a) and the constituent unit derived from the vinyl monomer (b). That is, Tga−TgB>0° C. is preferably satisfied.

$$Tga > TgB \tag{3}$$

More specifically, Tga−TgB>60° C. is preferably satisfied, and Tga−TgB>80° C. is most preferably satisfied.

TgB is calculated by the Fox calculation formula similarly to Tg of the copolymer (A).

The copolymer (A) has a hydroxyl group. In this manner, it is possible to cause a reaction between the copolymer (A) and the curing agent and to cure the copolymer (A).

At least a part of the hydroxyl group that the copolymer (A) is preferably any one of or both a secondary hydroxyl group and a tertiary hydroxyl group. In this manner, it is possible to set a gel fraction of one day after coating to be equal to or less than 70%. The gel fraction of one day after coating will be described later in detail.

The copolymer (A) may further include a primary hydroxyl group in addition to the secondary hydroxyl group and the tertiary hydroxyl group. It is possible to control the gel fraction of one day after coating depending on a ratio of the secondary hydroxyl group, the tertiary hydroxyl group, and the primary hydroxyl group. It becomes easier to perform a repair operation as the proportion of the secondary hydroxyl group and the tertiary hydroxyl group is higher.

The proportion of the total of the constituent unit that has at least one of the secondary hydroxyl group and the tertiary hydroxyl group is preferably equal to or greater than 15 parts by mass and equal to or less than 60 parts by mass, is more preferably equal to or greater than 25 parts by mass and equal to or less than 50 parts by mass, and is further preferably equal to or greater than 30 parts by mass and equal to or less than 40 parts by mass with respect to 100 parts by mass of the constituent unit of the copolymer (A). If the proportion of the total of the secondary hydroxyl group and the tertiary hydroxyl group is equal to or greater than the lower limit value of the aforementioned range, the gel fraction of one day after coating becomes sufficiently low.

The hydroxyl group may be included in the constituent unit that configures the copolymer (A), or may be included in the main chain terminal of the copolymer (A), or may be included in both of them. The hydroxyl group is preferably included at least in the constituent unit in terms of an increase in crosslinking density of the coating film.

The gel fraction of the copolymer (A) of one day after coating is preferably equal to or less than 70%.

The gel fraction of one day after coating is a gel fraction that is measured by the following measuring method for the coating film 24 hours after forming the coating film by the following coating method in regard to the copolymer (A).

"Coating Method"

A coating material composition is obtained by dissolving (meth)acrylic copolymer (copolymer (A)) and an isocyanurate form of hexamethylenediisocyanurate in an organic solvent such that a molar ratio of NCO/OH becomes 1/1, a polypropylene plate is coated with the coating material composition using a 6-mil applicator, a coating film is formed by performing drying at 70° C. for 30 minutes, and the coating film is preserved under conditions of a temperature at 23.5° C. and a relative humidity of 50%.

"Measurement Method of Gel Fraction"

About 0.2 g of the coating film is weighed and wrapped with a stainless mesh (SUS316, twilled wire gauge, φ0.04× 300 mesh), and ends thereof are pinched with clips, thereby obtaining a sample. The sample is placed in 500 g of a mixture solvent in which methanol:acetone=1:1 (mass ratio) is satisfied, the mixture is subjected to reflux stirring at 65° C. for 4 hours, and the sample is then taken out from the mixture solvent, is washed with 10 g of acetone, and is then dried at 105° C. for 2 hours using a hot wind dryer. Thereafter, the mass of the coating film remaining in the sample is measured and regarded as a mass after the drying, and the gel fraction is obtained by the following formula from the mass after the drying and the mass of the weighed coating film.

$$\text{Gel fraction (\%)} = \text{mass after drying (g)/mass of weighed coating film (g)} \times 100$$

The gel fraction is an index indicating hardness of the coating material composition. A lower gel fraction of one day after coating indicates that curing (crosslinking) of the coating material composition more hardly advances.

If the gel fraction of one day after coating is equal to or less than 70%, it is easy to perform a repair operation such as polishing since hardness of the coating film does not become excessively high until the repair operation ends after the coating material composition including the copolymer (A) and the curing agent is applied. Also, since the curing hardly advances, effects such as a long pot life of the coating material composition, and excellent handleability, high flowing properties immediately after coating, excellent appearance of the coating film (smoothness of the surface, uniformity of the thickness, and the like) are obtained.

From the aforementioned viewpoints, the gel fraction of one day after coating is preferably equal to or less than 70%, is more preferably equal to or less than 65%, and is further preferably equal to or less than 55%.

The gel fraction of one day after coating can be controlled depending on reactivity of the hydroxyl groups that the copolymer (A) has, for example. In the copolymer (A), reactivity of the secondary hydroxyl group and the tertiary hydroxyl group is lower than that of the primary hydroxyl group. As the proportions of the secondary hydroxyl group and the tertiary hydroxyl group in the hydroxyl groups that the copolymer (A) has are higher, the curing further tends to be delayed, and the gel fraction of one day after coating tends to become lower.

The gel fraction of eight days after coating of the copolymer (A) is preferably equal to or greater than 80%.

The gel fraction of eight days after coating is a gel fraction of the copolymer (A) measured by the aforementioned measuring method for a coating film formed by the aforementioned coating method 192 hours after the formation of the coating film.

If the coated article is caused to move before the coating film is cured to some extent, the coating film is deformed, and an appearance and the like are degraded. Therefore, it is not possible to move on to the next process until the coating film is cured to some extent. If the gel fraction of eight days after coating is equal to or greater than 80%, it is possible to sufficiently shorten the time until the next process is caused to proceed after the coating, and excellent producibility is achieved. Also, when the coating film is fully cured, hardness of the coating film becomes sufficiently high, and scratching due to sand or the like and damage by a rotation brush or the like at the time of washing with a car washing machine hardly occur.

From the aforementioned viewpoints, the gel fraction of eight days after coating is preferably equal to or greater than 80% and is more preferably equal to or greater than 85%. The upper limit of the gel fraction of eight days after coating is not particularly limited and may be 100%.

The gel fractions of one day later and eight days described above preferably satisfy 100≥(gel fraction of eight days after coating)−(gel fraction of one day after coating)≥40 from the points of repair operability and scratch resistance of the coating film. More preferably, the gel fractions satisfy 100≥(gel fraction of eight days after coating)−(gel fraction of one day after coating)≥45, and most preferably satisfies 100≥(gel fraction of eight days after coating)−(gel fraction of one day after coating)≥70.

The Martens hardness (HM) of one day after coating of the copolymer (A) is preferably equal to or less than 10, is more preferably equal to or less than 9, and is further preferably equal to or less than 8. The Martens hardness (HM) of eight days after coating is preferably equal to or greater than 100, is more preferably equal to or greater than 120, is particularly preferably equal to or greater than 140, and is most preferably equal to or greater than 160. If the Martens hardness (HM) of one day after coating of the copolymer (A) is equal to or less than 10, it is possible to more efficiently perform a repair operation. If the Martens hardness (HM) of eight days after coating of the copolymer (A) is equal to or greater than 100, more excellent scratch resistance is achieved.

(Hardness (HM) of Coating Film)

The Martens hardness (HM) of the coating film can be measured by an ultra-micro hardness meter (sample manufactured by Fischer Instruments K.K., product name: HM2000). As measurement conditions, F (test force)=50 mN/10 seconds and C (maximum load creep time)=10 seconds is set. Martens hardness is measured at mutually different 5 locations in the same coating film, and an average value of them is regarded as hardness of the coating film.

(Solubility Parameters (SP))

In the copolymer (A), a solubility parameter SP (SPa) of the macromonomer (a) and SP (SPB) of the polymer (B) obtained by polymerizing only the vinyl monomer (b) preferably satisfy SPB−SPa>3 from the viewpoint that the respective properties of the constituent unit derived from the macromonomer (a) and the constituent unit derived from the vinyl monomer (b) can be sufficiently expressed. SPB−SPa>3.5 is more preferably satisfied, and SPB−SPa>4 is most preferably satisfied.

Each SP is obtained by a known method described in R. F. Fedors, "Polymer engineering and science (Polym. Eng. Sci)". (1974), 14(2), p. 147, p. 472. Specifically, each SP is a value calculated using the following formula.

$$\delta = \Sigma(mi\delta i)$$

In the aforementioned formula, mi represents a molar fraction of a monomer i that configures the polymer, and δi represents an SP of the monomer i that configures the polymer.

<Method of Manufacturing Copolymer (A)>

The copolymer (A) can be manufactured by copolymerizing the macromonomer (a) and the vinyl monomer (b).

At least one of the macromonomer (a) and the vinyl monomer (b) preferably includes a monomer that has a hydroxyl group. The monomer that has a hydroxyl group preferably includes a secondary/tertiary OH-containing monomer and may further include a primary OH-containing monomer.

As a method of manufacturing the copolymer (A), a method of polymerizing a monomer mixture including the macromonomer (a) and the vinyl monomer (b) (hereinafter, also referred to as a "manufacturing method (α)) is preferably used. That is, the copolymer (A) is preferably a polymerization product of a monomer mixture including the macromonomer (a) and the vinyl monomer (b). In such a polymerization product, the constituent unit derived from the macromonomer (a) and the constituent unit derived from the vinyl monomer (b) are randomly aligned. That is, polymer chains derived from a plurality of macromonomers (a) are bonded over the entire main chain of the copolymer (A). Such a polymerization product tends to exhibit more excellent hardness and elasticity of the formed coating film as compared with a case in which the constituent unit derived from the macromonomer (a) is bonded only to the terminal of the polymer chain constituting of the constituent unit derived from the vinyl monomer (b), for example.

The types of the monomers that configures the monomer mixture and the content (mass %) of each monomer with respect to the total mass of all the monomers are similar to the types of the constituent unit derived from the monomers that configure the copolymer (A) and the content (mass %) of each constituent unit with respect to the total mass of all the constituent units.

In a case in which the content of the constituent unit derived from the macromonomer (a) in the copolymer (A) is equal to or greater than 7% by mass and equal to or less than 60% by mass with respect to the total mass (100% by mass) of all the constituent units, for example, the content of the macromonomer (a) with respect to the total mass of all the monomers that configure the monomer mixture is equal to or greater than 7% by mass and equal to or less than 60% by mass.

As a method of polymerizing the monomer mixture, a known polymerization method such as a solution polymerization method, a suspension polymerization method, a bulk polymerization method, or an emulsion polymerization method can be applied. The solution polymerization method is preferably used in terms of productivity and coating film performances.

The polymerization may be performed by a known method using a known polymerization initiator. For example, a method of causing a reaction of the aforementioned monomer mixture at a reaction temperature of 60 to 190° C. for 2 to 14 hours in presence of a radical initiator is exemplified. A chain-transfer agent may be used as needed for the polymerization.

As the radical initializer, a known radical initializer can be used, and examples thereof include 2,2-azobisisobutylonitrile, 2,2-azobis(2,4-dimethylvaleronitrile), 2,2-azobis(2-methylbutylonitrile), benzoyl peroxide, cumene hydroperoxide, lauryl peroxide, di-t-butylperoxide, and t-butylperoxy-2-ethylhexanoate.

As the chain-transfer agent, a known chain-transfer agent can be used, and examples thereof include mercaptans such as n-dodecylmercaptan, thioglycolic acid esters such as octyl thioglycolate, an α-methylstyrene dimer, and terpinolene.

As a solvent for s solution polymerization method, it is possible to use a general organic solvent such as toluene, xylene, propylene glycol monomethyl ether acetate, methylisobutyl ketone, n-butyl acetate, and ethyl 3-ethoxypropionate.

The copolymer (A) is obtained as described above.

However, the method of manufacturing the copolymer (A) is not limited to the manufacturing method (α), and the copolymer (A) may be manufactured by a manufacturing method other than the manufacturing method (α).

As a manufacturing method other than the manufacturing method (α), a manufacturing method of adding the macromonomer (a) to a polymer including the vinyl monomer (b), for example, is exemplified.

<Effects and Advantages>

Since the copolymer (A) includes the constituent unit derived from the macromonomer (a) and the constituent unit derived from the vinyl monomer (b), the copolymer (A) has a hydroxy group, and the content of the constituent unit that has a primary hydroxyl group is equal to or less than 30 parts by mass with respect to 100 parts by mass of the constituent unit derived from the macromonomer (a) and the constituent unit derived from the vinyl monomer (b), it is possible to efficiently perform a repair operation of the formed coating film after coating a product to be coated with a coating material composition including the copolymer (A). Also, a coating material composition with a long pot life is obtained. In addition, flowing properties immediately after coating of the coating material composition are enhanced, and a coating film with an excellent appearance is obtained.

In a case of a random copolymer with the same composition as that of the copolymer (A), that is, a random copolymer obtained by copolymerizing the monomer that configures the macromonomer (a) and the vinyl monomer (b) at the same ratio (hereinafter, also referred to as a "random copolymer (X)") without using the macromonomer (a), the gel fraction of one day after coating tends to exceed 70%, and a difference between the gel fraction of one day after coating and the gel fraction of eight days after coating tends to be small. Similarly, in a case of a copolymer that has only a primary hydroxyl group as a hydroxyl group (hereinafter, also referred to as a "copolymer (Y)"), the gel fraction of one day after coating tends to exceed 70%, and the difference between the gel fraction of one day after coating and the gel fraction of eight days after coating tends to be small even if the constituent unit derived from the macromonomer (a) and the constituent unit derived from the vinyl monomer (b) are included.

Therefore, as the copolymer (A) that satisfies both the gel fraction of one day after coating being equal to or less than 70% and the gel fraction of eight days after coating being equal to or greater than 80%, a copolymer that includes the constituent unit derived from the macromonomer (a) and the constituent unit derived from the vinyl monomer (b) and that has any one of or both a secondary hydroxyl group and a tertiary hydroxyl group is preferably used.

In the copolymer (A), reactivity of the secondary hydroxyl group and the tertiary hydroxyl group is low as compared with the primary hydroxyl group as described above. If the secondary hydroxyl group and the tertiary hydroxyl group are included, curing is delayed, and the gel fraction of one day after coating decreases. Meanwhile, since curing sufficiently advances eight days after coating even if curing is delayed as long as sufficient hydroxyl groups are present, the gel fraction can be high.

The copolymer (A) of the invention can be used for a coating material composition, a decorative film, an ink, a dispersant, a viscosity adjuster, a compatibilizer, an adhesive, a pressure-sensitive adhesive, and the like and is useful as a film forming resin of a coating material composition, in particular.

[Coating Material Composition]

The coating material composition according to the invention includes the aforementioned copolymer (A) as a film forming resin.

One kind of copolymer (A) may be included, or two or more kinds of copolymer (A) may be included in the coating material composition.

<Content of Each Constituent>

The content of the copolymer (A) in the coating material composition is preferably equal to or greater than 30% by mass and equal to or less than 100% by mass, is more preferably equal to or greater than 60% by mass and equal to or less than 100% by mass, or may be 100% by mass with respect to 100% by mass of a resin solid content in the coating material composition. If the content of the copolymer (A) is equal to or greater than the aforementioned lower limit value, hardness of the coating film and an increase speed of the hardness after the formation of the coating film further increases.

The resin solid content is a total mass of the resin constituent included in the coating material composition in terms of solid content.

<Curing Agent>

The coating material composition according to the invention can further include a curing agent.

If the coating material composition includes a curing agent, a coating film with high crosslinking density tends to be formed when the coating material composition is cured, and more excellent hardness, film formation properties, and the like of the coating film tend to be achieved. Also, in a case in which the copolymer (A) has a self-crosslinking property, for example, in a case in which both a hydroxyl group and an isocyanato group are included, it is possible to obtain sufficient hardness, film formation properties, and the like without the curing agent included.

As the curing agent, any compound can be used as long as the compound can cause a reaction with the hydroxyl group that the copolymer (A) has and can cure the coating material composition, and any curing agent can be appropriately selected from known curing agents. Examples thereof include a compound that has two or more reactive functional groups such as an isocyanato group, a blocked isocyanato group, an amino group, an epoxy group, a carboxy group, and a carbodiimide group, and a metal chelate-based curing agent.

Examples of the compound that has two or more reactive functional groups include isocyanate-based curing agents such as a polyisocyanate compound and a blocked polyisocyanate compound and amino resin, and the isocyanate-based curing agent is preferably used.

The polyisocyanate compound is a compound that has at least two isocyanato groups in a molecule, and examples thereof include:

aliphatic diisocyanate compounds such as hexamethylene diisocyanate, trimethylhexamethylene diisocyanate, dimer acid diisocyanate, and lysine diisocyanate;

alicyclic diisocyanate compound such as hydrogenated xylene diisocyanate, cyclohexylene diisocyanate, isophorone diisocyanate;

aromatic diisocyanate compound such as tolylene diisocyanate, phenylene diisocyanate, 4,4'-diphenylmethane diisocyanate, xylylene diisocyanate, tetramethylxylylene diisocyanate, and naphthalene diisocyanate;

trivalent or more organic polyisocyanate compounds such as 2-isocyanatoethyl-2,6-diisocyanatocaproate, 3-isocyanatomethyl-1,6-hexamethylene diisocyanate, 4-isocyanatomethyl-1,8-octamethylene diisocyanate (commonly known as triaminononane triisocyanate);

dimers or trimers of these polyisocyanate compounds; and prepolymers obtained by urethan reaction between these polyisocyanate compounds and a polyvalent alcohol, low-molecular-weight polyester resin, or water under a condition of excessive isocyanate groups.

The blocked polyisocyanate compound is a compound obtained by blocking an isocyanato group in a polyisocyanate compound with a blocking agent.

Examples of the blocking agent include phenol-based blocking agents such as phenol, cresol, xylenol, nitrophenol, ethyl phenol, hydroxy diphenyl, butyl phenol, isopropyl phenol, nonyl phenol, octyl phenol, and methyl hydroxybenzoate;

lactam-based blocking agents such as ε-caprolactam, δ-valerolactam, γ-butylolactam, and β-propiolactam;

aliphatic alcohol-based blocking agents such as methanol, ethanol, propyl alcohol, butyl alcohol, amyl alcohol, and lauryl alcohol;

ether-based blocking agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxy methanol;

alcohol-based blocking agents such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate;

oxime-based blocking agents such as formamide oxime, acetamide oxide, acetoxime, methyl ethyl ketoxime, diacetyl monoxime, benzophenone oxime, and cyclohexane oxime;

active methylene-based blocking agents such as dimethyl malonate, diethyl malonate, ethyl acetoacetate, methyl acetoacetate, and acetyl acetone;

mercaptan-based blocking agents such as butyl mercaptan, t-butyl mercaptan, hexyl mercaptan, t-dodecyl mercaptan, 2-mercaptobenzothiazole, thiophenol, methyl thiophenol, and ethyl thiophenol;

acid amide-based blocking agents such as acetanilide, acetanisidide, acetotoluide, acrylamide, methacrylamide, amide acetate, amide stearate, and benzamide;

imide-based blocking agents such as succinic acid imide, phthalic acid imide, and maleic acid amide;

amine-based blocking agents such as diphenylamine, phenylnaphthylamine, xylidine, N-phenylxylidine, carbazole, aniline, naphthylamine, butylamine, dibutylamine, and butylphenylamine;

urea-based blocking agents such as urea, thiourea, ethylene urea, ethylene thiourea, and diphenyl urea;

carbamic acid ester-based blocking agents such as N-phenylcarbamic acid phenyl;

imine-based blocking agents such as ethyleneimine and propyleneimine;

sulfite-based blocking agents such as sodium bisulfite and potassium bisulfite; and azole-based blocking agents of pyrazole or pyrazole derivatives such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole, imidazole or imidazole derivatives such as imidazole, benzimidazole, 2-methylimidazole, 2-ethylimidazole, and 2-phenylimidazole, imidazoline derivatives such as 2-methylimidazoline and 2-phenylimidazoline, and the like.

As the amino resin, it is possible to use partially methylolated amino resin or fully methylolated amino resin obtained through a reaction between an amino constituent and an aldehyde constituent. Examples of the amino constituent include melamine, urea, benzoguanamine, acetoguanamine, steroguanamine, spiroguanamine, and dicyandiamide. Examples of the aldehyde constituent include formaldehyde, paraformaldehyde, acetaldehyde, and benzaldehyde.

As the amino resin, a substance obtained by partially or fully etherifying a methylol group in the methylolated amino resin with alcohol can also be used. Examples of the alcohol used for the etherification include methyl alcohol, ethyl alcohol, n-propyl alcohol, isopropyl alcohol, n-butyl alcohol, isobutyl alcohol, 2-ethyl butanol, and 2-ethyl hexanol.

As the amino resin, melamine resin is preferably used, methyl etherified melamine resin, in which a methylol group of partially or fully methylolated melamine resin is partially or fully etherified with methyl alcohol, butyl etherified resin in which a methylol group of partially or fully methylolated melamine resin is partially or fully etherified with butyl alcohol, and methyl-butyl mixed etherified melamine resin in which a methylol group of partially or fully methylolated melamine resin is partially or fully etherified with methyl alcohol and butyl alcohol are preferably used, and methyl-butyl mixed etherified melamine resin is more preferably used.

A weight average molecular weight of the aforementioned melamine resin is preferably from about 400 to 6000, is more preferably from about 800 to 5000, is further preferably from about 1000 to 4000, and is most preferably from about 1200 to 3000.

<Organic Solvent>

The coating material composition according to the invention preferably includes an organic solvent. If the coating material composition includes an organic solvent, more excellent coating suitability, water resistance of the formed coating film, film formation properties, and the like are achieved. The organic solvent is not particularly limited as long as it is possible to dissolve the copolymer (A), and examples thereof include:

hydrogen carbonate-based solvents such as heptane, cyclohexane, toluene, xylene, octane, and mineral spirit;

ester-based solvents such as ethyl acetate, acetic acid n-butyl, isobutyl acetate, ethylene glycol monomethylether acetate, and diethylene glycol monobutylether acetate;

ketone-based solvents such as methyl ethyl ketone, methyl isobutyl ketone, diisobutyl ketone, and cyclohexanone;

alcohol-based solvents such as methanol, ethanol, isopropanol, n-butanol, s-butanol, and isobutanol;

ethers such as dioxane, ethylene glycol monoethyl ether, ethylene glycol monobutyl ether, and propylene glycol monopropyl ether; and aromatic petroleum-based solvent such as Swazol 310, Swazol 1000, and Swazol 1500 manufactured by Cosmo Energy Group. Any one kind of these organic solvents may be used alone, or two or more kinds thereof may be used in combination.

<Other Constituents>

The coating material composition according to the invention may further include constituents other than the copolymer (A), the curing agent, and the organic solvent without impairing the effects of the invention as needed.

Examples of other constituents include resin such as polyester resin other than the copolymer (A), phenol resin, polyether resin, and epoxy resin, a curing catalyst, a cissing inhibitor, resin, a pigment (such as a coloring pigment, glossy pigment, and an extender pigment), an anti-fouling agent, an anti-foaming agent, a pigment dispersant, a leveling agent, an anti-sagging agent, a matting agent, an ultraviolet absorbing agent, an antioxidant, a heat resistance improving agent, a slipping agent, a preservative, a plasticizer, and a viscosity modifier.

Examples of the curing catalyst include dibutyltin dilaurate, dibutyltin diacetate, dibutyltin dioctate, triethylamine, a diethanolamine, paratoluene sulfonic acid, dodecylbenzene sulfonic acid, dinonylnaphthalene sulfonic acid, a neutralized salt of the sulfonic acid and amine, and a neutralized salt of a phosphoric acid ester compound and amine.

A coating material composition according to a preferable aspect of the invention is a clear coating material composition. The coating material composition according to the aspect includes the copolymer (A) and an organic solvent and does not include a coloring pigment. The coating material composition according to the aspect can further include a curing agent. The coating material composition according to the aspect can further include constituents other than the copolymer (A), the curing agent, and the coloring pigment.

The gel fraction of one day after coating of the coating material composition according to the invention is preferably equal to or less than 70% and is more preferably equal to or less than 65% in terms of efficiency of a repair operation.

The gel fraction of one day after coating of the coating material composition is measured similarly to the gel fraction of one day after coating of the copolymer (A) other than that the coating material composition according to the invention is used as a coating material composition for forming the coating film. That is, a polypropylene is coated with the coating material composition according to the invention with a 6-mil applicator, a coating film is formed by performing drying at 70° C. for 30 minutes and is then preserved (protected) under conditions at a temperature of 23.5° C. and a relative humidity of 50%, and the gel fraction is obtained by the aforementioned gel fraction measurement method for the coating film 24 hours after the preservation is started.

The gel fraction of one day after coating of the coating material composition can be controlled depending on the type of the copolymer (A), and the type, the amount, and the like of a curing catalyst. The gel fraction of one day after coating tends to be low as the content of the curing catalyst decreases, for example.

As for the coating material composition according to the invention, the gel fraction of the coating material composition of eight days after coating is preferably equal to or greater than 80% and equal to or less than 100% and is more preferably equal to or greater than 85% and equal to or less than 100% in term of producibility, scratch resistance, and the like.

The gel fraction of eight days after coating of the coating material composition is measured similarly to the gel fraction of eight days after coating of the copolymer (A) other than that the coating material composition according to the invention is used as a coating material composition for forming the coating film.

<Content of Each Constituent>

The content of the copolymer (A) in the coating material composition is preferably equal to or greater than 30% by mass and equal to or less than 100% by mass, and is more preferably equal to or greater than 60% by mass and equal to or less than 100% by mass with respect to the resin solid content (100% by mass) in the coating material composition. If the content of the copolymer (A) is equal to or greater than the aforementioned lower limit value, hardness of the coating film and the increase speed of the hardness during preservation further increase.

The resin solid content is a total mass of the resin constituent included in the coating material composition in terms of solid content.

In a case in which the coating material composition includes a curing agent, the content of the curing agent in the coating material composition can be appropriately set in accordance with the type of the curing agent.

In a case in which the curing agent is a polyisocyanate compound or a blocked polyisocyanate compound, for example, such an amount that the molar ratio (NCO/OH) of the isocyanato group in the polyisocyanate compound or the blocked isocyanato group in the blocked polyisocyanate compound with respect to the hydroxyl group in the copolymer (A) preferably falls within a range of 0.5 to 2.

In a case in which the coating material composition includes an organic solvent, the content of the organic solvent in the coating material composition can be appropriately set in consideration of the solid content, the viscosity, and the like of the coating material composition.

The solid content of the coating material composition is preferably equal to or greater than 30% by mass and equal to or less than 80% by mass, is more preferably equal to or greater than 40% by mass and equal to or less than 78% by mass, and is further preferably equal to or greater than 45% by mass and equal to or less than 75% by mass. If the solid content is equal to or less than the upper limit value of the aforementioned range, it is possible to sufficiently reduce the viscosity of the coating material composition.

The solid content is measured by a measurement method described in examples described below.

The coating material composition according to the invention can be manufactured by manufacturing the aforementioned copolymer (A) and blending a curing agent, an organic solvent, other constituents, and the like in the obtained copolymer (A) as needed, for example.

<Effects and Advantages>

Since the coating material composition according to the invention includes the copolymer (A), it is possible to efficiently perform a repair operation of the formed coating film after coating a product to be coated with the coating material composition as described above. Also, a coating material composition with a long pot life is obtained. In addition, flowing properties immediately after coating of the coating material composition are enhanced, and a coating film with an excellent appearance is obtained.

[Coated Article]

The coated article according to the invention is a coated article with the aforementioned coating material composition according to the invention applied thereto.

The coated article according to the invention can be manufactured by applying the coating material composition according to the invention to a product to be coated and forming a coating film. Specifically, the coating material composition according to the invention is applied to the surface of the product to be coated to form an uncured coating film, and the uncured coating film is cured, thereby obtaining a cured coating film. In this manner, a coated article is obtained.

The cured coating film is a film in a cured and dried state defined by JIS K 5600-1-1 (2004), that is, in a state in which no depression occurs in a coated surface due to fingerprints, and no motion of the coating film is felt, when the center of the coated surface is strongly pinched with a thumb and a pointing finger, and no rubbing trace remains on the coated surface when the center of the coated surface is rapidly and repeatedly rubbed with finger tips.

The uncured coating film is in a state in which the coating film has not reached the aforementioned cured and dried state and includes a finger contact dried state and a half-cured dried state defined by JIS K 5600-1-1.

The product to be coated is not particularly limited, and preferable examples thereof include: an external plate portion of a vehicle main body of a general vehicle, a track, a motorcycle, a bus, or the like; a vehicle component such as a bumper, a steering, a central console, an instrument panel, or a wheel; underwater structures such as a ship, various fishing nets, a port facility, an oil fence, a bridge, or a submarine base; a home appliances such as a mobile phone or an audio device; an external plate portion of an industrial device such as an agricultural machine or a construction machine. Among them, the external plate portion of the vehicle main body and the vehicle component are preferably exemplified as the product to be coated.

Materials of the product to be coated are not particularly limited, and examples thereof include metal materials such as iron, aluminum, brass, copper, a tin plate, stainless steel, galvanized steel, zinc alloy (such as Zn—Al, Zn—Ni, or Zn—Fe) plated steel; resin and various film materials such as polyethylene resin, polypropylene resin, acrylonitrile-butadiene-styrene (ABS) resin, polyamide resin, acrylic resin, vinylidene chloride resin, polycarbonate resin, polyurethane resin, and epoxy resin; plastic materials such as various fiber reinforced plastic (FRP); inorganic materials such as glass, cement, and concrete; wood materials; and fiber materials such as a paper or a cloth. Among them, the metal materials and the plastic materials are preferably used.

In a case in which the material of the product to be coated is a metal material, surface processing such as phosphatizing treatment, chromating treatment, and composite oxide processing may be performed on the surface of the product to be coated.

A film may be formed in advance on the surface of the product to be coated. In the case in which the material of the product to be coated is a metal material, the film may be formed on the surface on which the surface processing has been performed.

As the product to be coated with the film formed thereon, it is possible to exemplify a product obtained by performing surface processing as needed on the surface of the product to be coated and forming an underlayer coating film thereon, a product obtained by forming an intermediate coating film on the underlayer coating film, and the like.

Examples of the underlayer coating film include an electrodeposition coating such as a cationic electrodeposition coating.

A method of applying the coating material composition is not particularly limited, and a known coating method such as air spray coating, airless spray coating, rotary atomization coating, or a curtain coating application, for example, can be used. At the time of the coating, static electricity may be applied as needed.

The film thickness of the formed coating film can be appropriately set and is not particularly limited. For example, the film thickness of the cured coating film can be set to about 500 nm to 500 μm.

An uncured coating film can be cured (thermally cured) by heating. The heating of the uncured coating film can be performed by a known heating means. As the heating means, drying furnace such as a hot wind furnace, an electric furnace, or an infrared inductive heating furnace can be used. Although the heating temperature is not particularly limited, the heating temperature is preferably from about 50 to 180° C. Although the heating temperature is not particularly limited, the heating time is preferably from about 1 to 60 minutes.

Preliminary heating, air blowing, or the like may be performed under such heating conditions that the coating film is not substantially cured after the coating of the coating material composition and before the thermal curing is performed, in order to prevent coating film defects from occurring.

The temperature of the preliminary heating is preferably from about 30 to 100° C. The heating of the preliminary heating is preferably from about 30 seconds to 15 minutes.

The air blowing can typically be performed by blowing the air heated to a temperature of about 30 to 100° C. to the coated surface for about 30 seconds to 15 minutes.

It is possible to perform protection (preservation) after the coating film is thermally cured, in order to enhance the hardness of the coating film.

Protection conditions of 0 to 60° C. for 1 to 10 days can be used.

During the protection, a repair operation of the coating film may be performed as needed.

Examples of the repair operation include polishing with a polishing means such as a sand paper or huffing.

The period during which the repair operation is performed is preferably until three days after the start of the protection.

[Method for Forming Multilayer Coating Film]

The coating material composition according to the invention can be used to form a multilayer coating film.

Examples of the multilayer coating film include (1) a multilayer coating film including a coloring base coating film and a clear coating film and (2) a multilayer coating film including a first coloring base coating film, a second coloring base coating film, and a clear coating film.

The coating material composition according to the invention is useful as a clear coating for forming a clear coating film, in particular, among various coating films of such multilayer coating films.

In one example of a method for forming a multilayer coating film using the coating material composition according to the invention, a method of using the coating material composition according to the invention as the clear coating in a method for forming the first coloring base coating film by applying a first coloring base coating to a cured coating film of an electrodeposition coating, then applying a second coloring base coating to the first coloring base coating film and forming the second coloring base coating film without preliminarily heating or preliminary heating or thermally curing the first coloring base coating film, then applying the clear coating to the second coloring base coating film and forming a clear coating film after preliminary heating the first coloring base coating film and the second coloring base coating film, and thermally curing the formed three coating films to form a multilayer coating film at the same time (simultaneously) is exemplified.

According to the method for forming the multilayer coating film, the multilayer coating film in (2) described above is formed on the cured coating film of the electrodeposition coating.

The method for forming the multilayer coating film can be performed by using a known method other than that the coating material composition according to the invention is used as the clear coating.

The cured coating film of the electrodeposition coating can be formed by performing surface processing on the surface of the product to be coated, which is made of metal such as a steel plate, for example, as needed applying the electrodeposition coating thereon, and performing thermally curing the coating. As each of the first coloring base coating and the second coloring base coating, known coatings can be used. Examples thereof include a thermosetting coating material composition including a film forming resin with a crosslinking functional group, a curing agent and a coloring pigment. The thermosetting coating material composition can appropriately contain a glitter pigment, a dye, an extender pigment, an ultraviolet absorber, a photostabilizer, an antifoaming agent, a thickener, an anti-rust, and a surface adjuster as needed. The thermosetting coating material composition may any of an organic solvent-type coating material composition, a water-based coating material composition, and a powder coating material composition. Examples of the crosslinking functional group that the film forming resin has include a hydroxyl group, a carboxy group, and an epoxy group. Examples of types of film forming resin include acrylic resin, polyester resin, alkyd resin, and urethane resin. Curing agents that are similar to those described above are exemplified as the curing agent.

The coating of the first coloring base coating and the second coloring base coating and preliminary heating and thermal curing of the formed coating film can be performed similarly to the coating of the coating material composition and the preliminary heating and the thermal curing of the coating film according to the invention.

The heating temperature for thermally curing three coating films at the same time is preferably from about 80 to 180° C., is more preferably from about 100 to 170° C., and is further preferably from about 120 to 160° C. The heating time thereof is preferably from about 10 to 60 minutes and is more preferably from about 20 to 40 minutes.

The protection can be performed after the three coating films are thermally cured at the same time. As the protection conditions, conditions that are similar to those described above are exemplified.

The film thickness of the first coloring base coating film is typically preferably from about 5 to 50 μm, is more preferably from about 10 to 30 μm, and is further preferably from about 15 to 25 μm in terms of a cured film thickness.

The film thickness of the second coloring base coating film is preferably from about 3 to 30 μm, is more preferably from about 5 to 25 μm, is further preferably from about 8 to 20 μm, and is further particularly preferably from about 9 to 16 μm in terms of a cured film thickness.

The film thickness of the clear coating film is preferably from about 10 to 80 μm, is more preferably from amount 15 to 60 μm, and is further preferably from about 20 to 45 μm in terms of a cured film thickness.

The aforementioned method for forming the multilayer coating film can be used to coat a vehicle, for example.

In the coating of a vehicle, in general, a surface of a vehicle body or the like is coated with an electrodeposition coating, is further coated with an intermediate coating to form an intermediate coating-coating film, and is further coated with a top coating, thereby forming a top coating-coating film. If a composite coating film is formed by the aforementioned method for forming the multilayer coating film on the electrodeposition coating after coating of the electrodeposition coating, the first coloring base coating film of the multilayer coating film corresponds to the intermediate coating-coating film, and the second coloring base coating film and the clear coating film correspond to the top coating-coating film.

EXAMPLES

Although the invention will be described below in more detail with reference to examples, the following examples are not intended to limit the scope of the invention. In the respective examples, "parts" represent "parts by mass".

Measurement methods used in the respective examples will be described below.

<Measurement Method>

(Solid Content (NV))

0.50 g of measurement sample (a copolymer solution or a coating material composition) was weighed on a dish made of aluminum, 3 mL of toluene was added thereto with a syringe, and the mixture was uniformly spread at the bottom of the dish and preliminarily dried. The preliminary drying is processing for facilitating volatilization of the solvent in main drying. In the preliminary drying, the measurement sample and toluene were heated and dissolved in a water bath at 70 to 80° C. and were then vaporized, dried, and caused to become solid. After the preliminary drying, main drying was performed for 2 hours with a hot wind dryer at 105° C. The solid content (heating residual) was obtained by the following formula from the mass before the preliminary drying (mass before drying) and the mass after the main drying (mass after drying) of the measurement sample.

Solid content (mass %)=mass after drying/mass before drying×100

(Hydroxyl Value (OHV) of Copolymer)

The hydroxyl value (mgKOH/g) of the copolymer is measured by the JIS K 1557-1 A method.

(Number Average Molecular Weight (Mn) and Weight Average Molecular Weight (Mw) of Copolymer)

The number average molecular weight (Mn) and the weight average molecular weight (Mw) of the copolymer were measured using gel permeation chromatography (GPC) (manufactured by Tosoh Corporation, HLC-8220). As columns, TSKgel α-M (manufactured by Tosoh Corporation, 7.8 mm×30 cm) and TSKguardcolumn α (manufactured by Tosoh Corporation, 6.0 mm×4 cm) were used. Calibration curves were created using F288/F1/28/F80/F40/F20/F2/A1000 (manufactured by Tosoh Corporation, standard polystyrene) and a styrene monomer.

(Glass Transition Temperature (Calculated Tg) of Copolymer)

The glass transition temperature of the copolymer was calculated by the Fox calculation formula from glass transition temperature of a homopolymer of each monomer that configures the copolymer and a mass fraction of each monomer.

(SP)

For the copolymer using the macromonomer, SP (Solubility Parameter: $\delta$ $(J/cm^3)^{1/2}$) of each of the main chain (a portion formed from the vinyl monomer) and the side chain (a portion formed from the macromonomer) was obtained. For the copolymer that does not use the macromonomer, SP of the entire copolymer was obtained. Each SP was obtained by a known method described in R. F. Fedors, "Polymer engineering and science (Polym. Eng. Sci)". (1974), 14(2), p. 147, p. 472. Specifically, each SP is a value calculated using the following formula.

$$\delta = \Sigma(mi\delta i)$$

In the aforementioned formula, mi represents a molar fraction of a monomer i that configures the polymer, and $\delta i$ represents an SP of the monomer i that configures the polymer.

(Gel Fraction of Coating Film)

About 0.2 g of coating film was measured and wrapped with a stainless mesh (SUS316, twilled wire gauge, φ0.04× 300 mesh), and ends thereof are pinched with clips, thereby obtaining a sample. The sample was poured into a 2 L flask along with 500 g of mixed solvent containing methanol: acetone=1:1 (mass ratio), reflux was performed at 62° C. for 4 hours, and the aforementioned sample was then taken out from the mixed solvent, was washed with 10 g of acetone, and was dried at 105° C. for 2 hours with a hot wind drier. Thereafter, the mass of the coating film remaining in the aforementioned sample was measured as a mass after drying, and the gel fraction was obtained by the following formula from the mass after drying and the mass of the weighed coating film.

Gel fraction (%)=mass after drying (g)/mass of weighed coating film (g)×100

A difference between the gel fraction of eight days after coating and the gel fraction of one day after coating was also obtained.

(Hardness (HM) of Coating Film)

The Martens hardness (HM) of the coating film was measured by an ultra-micro hardness meter (sample manufactured by Fischer Instruments K.K., product name: HM2000). As measurement conditions, F (test force)=50 mN/10 seconds and C (maximum load creep time)=10 seconds is set. Martens hardness is measured at mutually different 5 locations in the same coating film, and an average value of them is regarded as hardness of the coating film.

Synthesis Example 1

(Manufacturing of Dispersant 1)

900 Parts of deionized water, 60 parts of sodium 2-sulfoethyl methacrylate, 10 parts of potassium methacrylate, and 12 parts of methyl methacrylate (MMA) were poured into and stirred in a polymerization device provided with a stirrer, a cooling tube, a thermometer, and a nitrogen gas introduction tube, and the temperature was raised to 50° C. while the inside of the polymerization device was substituted with nitrogen. 0.08 parts of 2,2'-azobis (2-methylpropionamidine) dihydrochloride was added thereto as a polymerization initiator, and the temperature was further raised to 60° C. After the temperature was raised, MMA was successively dropped at a speed of 0.24 parts/minute for 75 minutes using a dropping pump. After the reaction solution was held at 60° C. for 6 hours and was cooled to a room temperature, thereby obtaining 10% by mass of dispersant 1 in terms of solid content, which was a transparent aqueous solution.

(Manufacturing of Chain-Transfer Agent)

1.00 g of cobalt(II) acetate tetrahydrate, 1.93 g of diphenylglyoxyme, and 80 ml of diethyl ether deoxygenated by nitrogen bubbling in advance were poured into a synthesis device provided with a stirring device in a nitrogen atmosphere and were stirred at a room temperature for 30 minutes. Then, 10 ml of boron trifluoride-diethyl ether complex was added thereto, and the mixture was further stirred for 6 hours. The mixture was filtrated, the solid was washed with diethyl ether and was vacuum dried for 15 hours, thereby obtaining 2.12 g of chain-transfer agent 1 that is a reddish brown solid.

(Manufacturing of Macromonomer 1)

145 parts of deionized water, 0.1 parts of sodium sulfate, and 0.25 parts of dispersant 1 (solid content of 10% by mass) were poured into and stirred in a polymerization device provided with a stirrer, a cooling tube, a thermometer, and a nitrogen gas introduction tube, thereby obtaining a uniform aqueous solution. Next, 100 parts of MMA, 0.008 parts of chain-transfer agent 1, and 0.8 parts of Perocta (registered trademark) O (1,1,3,3-tetramethylbutyl peroxy 2-ethylhexanoate, manufactured by NOF Corporation) as a polymerization initiator were added thereto, thereby obtaining a water-based suspension.

Next, the inside of the polymerization device was substituted with nitrogen, the temperature was raised to 80° C., reaction was caused for 1 hour, and the temperature was raised to and maintained at 90° C. for 1 hours in order to further raise a polymerization rate. Thereafter, the reaction solution was cooled to 40° C., thereby obtaining a water-based suspension including the macromonomer. The water-based suspension was filtrated with a filter, and a residual remaining on the filter was washed with deionized water, was dehydrated, and dried at 40° C. for 16 hours, thereby obtaining the macromonomer 1. The number average molecular weight of the macromonomer 1 was 1700, and the glass transition temperature obtained by DSC measurement was 63° C. Materials used for manufacturing the macromonomer 1 and Mn of the macromonomer 1 are shown in Table 1.

(Manufacturing of Macromonomer 2)

A macromonomer was obtained by a similar method to Synthesis Example 1 other than that 100 parts of MMA was changed to 50 parts of MMA and 50 parts of IBXMA, and 0.8 parts of PEROCTA (registered trademark) O (1,1,3,3-tetramethylbutyl peroxy 2-ethylhexanoate manufactured by NOF Corporation) was changed to 1.1 parts. The number average molecular weight was 1700. Materials used to manufacture the macromonomer 2 and Mn of the macromonomer 2 are shown in Table 1.

TABLE 1

|  |  | Macromonomer 1 | Macromonomer 2 |
|---|---|---|---|
| Monomer composition | MMA (parts) | 100 | 50 |
|  | IBXMA (parts) | — | 50 |
| Polymerization initiator | PEROCTA O (parts) | 0.8 | 1.1 |
| Chain-transfer agent 1 (parts) |  | 0.008 | 0.008 |
| Mn |  | 1700 | 1700 |

Example 1

(Manufacturing of Copolymer Solution)

In a reaction container provided with a thermometer, a temperature adjusting machine, a stirring device, a reflux cooling device, a nitrogen gas introduction tube, and a dropping device, 50 parts of butyl acetate and 30 parts of macromonomer (MM-MMA) were placed, the inside of a polymerization device was substituted with nitrogen, and the temperature was raised to 120° C. To the container, a monomer-containing mixture including 20 parts of styrene, 13.9 parts of isobornyl acrylate, 36 parts of 2-hydroxypropyl acrylate, 0.1 parts of acrylic acid, 10 parts of butyl acetate, 3.0 parts of PERBUTYL O (t-butyl peroxy 2-ethylhexanoate manufactured by NOF Corporation), and 3.0 parts of 2,2'-azobis (2-methylbutylonitrile) was dropped for 4 hours. After the dropping ends, 5 parts of butyl acetate was rapidly dropped, and the mixture was then caused to age for 30 minutes. Thereafter, a mixture of 20 parts of butyl acetate and 0.2 parts of PERBUTYL O was dropped for 30 minutes, and the mixture was then caused to age for 1.5 hours after the dropping ends. Thereafter, 15 parts of butyl acetate was further added thereto, thereby obtaining a copolymer solution with solid content of 51.8% by mass. The hydroxyl value (OHV) of the copolymer included in the thus obtained copolymer solution was 155 mgKOH/g, the number average molecular weight (Mn) was 4000, the weight average molecular weight (Mw) was 8800, calculated Tg was 38.4° C., SP of a main chain was 23.6 $(J/cm^3)^{1/2}$, and SP of the side chain was 20.3 $(J/cm^3)^{1/2}$.

(Evaluation)

The copolymer solution and the isocyanurate form of hexamethylenediisocyanurate (DURANATE (registered trademark) TPA100, manufactured by Asahi Kasei Corporation, non-volatile content: 100%, NCO group content: 23.1%) were mixed such that the molar ratio of NCO/OH became 1/1, thereby preparing a coating material composition.

A polypropylene plate was coated with the coating material composition with a 6-mil applicator and was dried at 70° C. for 30 minutes to form a coating film, and the coating film was protected (preserved) under conditions at a temperature of 23.5° C. and a relative humidity of 50%.

The gel fraction and hardness of the coating film of 24 hours (one day after coating) and 192 hours (eight days after coating) after the start of the protection (preservation) were measured. The results are shown in Table 2.

Examples 2 to 5 and Comparative Examples 1 to 4

Copolymer solutions were obtained similarly to Example 1 other than that materials prepared in a reaction container before a temperature rise (initial preparation) and compositions of monomer-containing mixtures that were initially dropped after the temperature rise were set as shown in Table 2. The hydroxyl values (OHV), the number average molecular weights (Mn), the weight average molecular weights (Mw), calculated Tg, and SP of the copolymers included in the respective copolymer solutions are shown in Table 2.

The thus obtained copolymer solutions were evaluated similarly to Example 1. The results are shown in Table 2.

TABLE 2

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Initial preparation (parts) | Butyl acetate | 50 | 50 | 50 | 50 | 50 | 50 | 50 | 50 | 50 |
|  | Macromonomer 1 | 30 |  | 30 | 30 | 20 | 30 | 40 | 40 |  |
|  | Macromonomer 2 |  | 40 |  |  |  |  |  |  |  |
| Monomer-containing mixture (parts) | MMA |  |  |  |  |  |  |  |  | 30 |
|  | St | 20 |  |  |  |  |  | 20 |  | 20 |
|  | IBXA | 13.9 | 20 | 19.9 | 24.9 | 24.9 | 28.9 |  | 27 | 13.9 |
|  | EHA |  | 5 |  | 16 | 15 |  | 5 | 23 |  |
|  | HPMA |  |  |  |  | 25 |  |  |  |  |
|  | HPA | 36 | 30 | 25 | 19 |  | 21 |  |  | 36 |
|  | HEA |  | 5 | 25 | 10 | 15 | 20 | 35 | 10 |  |
|  | AA | 0.1 |  | 0.1 | 0.1 | 0.1 | 0.1 |  |  | 0.1 |
|  | Perbutyl O | 3 | 6 | 6 | 6 | 6 | 6 | 6 | 4.4 | 3 |
|  | AMBN | 3 | — | — | — | — | — | — | — | 3 |
|  | Butyl acetate | 10 | 10 | 10 | 10 | 10 | 10 | 10 | 10 | 10 |
| Polymerization | temperature (° C.) | 120 | 120 | 120 | 120 | 120 | 120 | 120 | 120 | 120 |
| Copolymer | OHV(mgKOH/g) | 155 | 153 | 228 | 130 | 170 | 187 | 169 | 48 | 155 |
|  | Mw | 8800 | 8100 | 8400 | 7900 | 7300 | 8300 | 13400 | 14700 | 9200 |
|  | Calculated Tg (° C.) | 38.4 | 37.7 | 23.8 | 21.4 | 27.5 | 34.8 | 38.8 | 35 | 38.4 |
|  | SP [$\delta(J/cm^3)^{1/2}$] (main chain/side chain) | 23.6/20.3 | 24.2/19.9 | 25.4/20.3 | 23.4/20.3 | 23.5/20.3 | 24.9/20.3 | 24.7/20.3 | 22.0/20.3 | 22.4 |

TABLE 2-continued

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Coating film | Difference of sp values (main chain-side chain) | 3.3 | 4.3 | 5.1 | 3.1 | 3.2 | 4.6 | 4.4 | 1.7 | — |
|  | HM after one day (N/mm$^2$) | 7.9 | 8.2 | 3.9 | 8.9 | 7.4 | 35.7 | 15.0 | 15.7 | 62.8 |
|  | Gel fraction after one day (%) | 0.3 | 0.1 | 54.5 | 44.9 | 49.6 | 69.3 | 71.2 | 0 | 90.3 |
|  | HM after eight days (N/mm$^2$) | 166.6 | 157.7 | 156.7 | 139.0 | 145.0 | 163.9 | 162.0 | 96.1 | 161.5 |
|  | Gel fraction after eight days (%) | 91 | 89.9 | 94.7 | 91.1 | 96.8 | 93.9 | 94.6 | 78.7 | 95.7 |
| (Gel fraction of eight days after coating) − (gel fraction of one day after coating) | | 90.7 | 89.8 | 40.2 | 46.2 | 47.2 | 24.6 | 23.4 | 78.7 | 5.4 |

In table, abbreviates in relation to the monomer mixture have the following meanings.

Macromonomer 1: a macromonomer that was obtained in Synthesis Example 1 and that had a number average molecular weight of 1700

Macromonomer 2: a macromonomer that was obtained in Synthesis Example 2 and that had a number average molecular weight of 1700

MMA: methyl methacrylate
St: styrene
IBXA: isobornyl acrylate
EHA: 2-ethylhexyl acrylate
HPMA: 2-hydroxypropyl methacrylate
HPA: 2-hydroxypropyl acrylate
HEA: 2-hydroxyethyl acrylate
AA: acrylic acid
AMBN: 2,2'-azobis (2-methylbutyronitrile)

Since the constituent unit that has the primary hydroxyl group exceeded 30 parts by mass even when the macromonomer 1 was used in the copolymer in Comparative Example 1, the gel fraction of one day after coating exceeded 70%. Since the hydroxyl value was less than 120 mgKOH/g in the copolymer in Comparative Example 2, the gel fraction of eight days after coating was equal to or less than 80%, and HM was also equal to or less than 100. The gel fraction of one day after coating of the copolymer in Comparative Example 3 that was a random copolymer that did not use the macromonomer exceeded 70%.

It was observed from these results that in the case in which the constituent unit derived from the macromonomer and the constituent unit derived from the vinyl monomer were included and the primary hydroxyl group was equal to or less than 30 parts by mass, it was possible to sufficiently increase the gel fraction and the hardness of eight days after coating while reducing initial hardness.

INDUSTRIAL APPLICABILITY

According to the invention, it is possible to provide a coating material composition that enables an efficient repair operation of a coating film after coating, a (meth)acrylic copolymer that is suitable for obtaining the coating material composition, and a coated article and a method for forming a multilayer coating film using the coating material composition.

The invention claimed is:

1. A coating material composition, comprising:
a (meth)acrylic copolymer (A) and a polyisocyanate compound or blocked polyisocyanate compound,
wherein the (meth)acrylic copolymer (A) has an acid value greater than 0 mgKOH/g and equal to or less than 80 mgKOH/g, and comprises:
a macromonomer constituent unit (a), and
a constituent unit (b) derived from a vinyl monomer,
wherein the constituent unit (a) is present in a range of from 30 to 60% by mass with respect to a total mass of all constituent units of the (meth)acrylic copolymer (A),
wherein a hydroxyl value of the (meth)acrylic copolymer (A) is in a range of from 120 to 260 mgKOH/g,
wherein the constituent unit (b) comprises a constituent unit derived from a carboxyl group-comprising vinyl-based monomer,
wherein the (meth)acrylic copolymer (A) comprises a mixture of constituent units having primary hydroxyl groups and secondary/tertiary hydroxyl groups and a content of the constituent unit having secondary/tertiary hydroxyl groups is greater than 50% by mass and equal to or less than 95% by mass with respect to the total mass of the constituent unit that has a hydroxyl group,
wherein the (meth)acrylic copolymer (A) comprises no more than 30 parts by mass of a constituent unit having a primary hydroxyl group, with respect to 100 parts by mass of the constituent unit (a) and the constituent unit (b), and
wherein the macromonomer (a) is of formula (1)

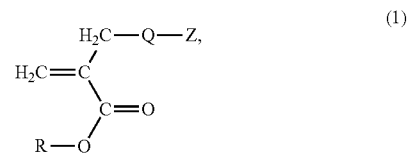

(1)

wherein, in formula (1),
R is H, an optionally substituted alkyl group, an optionally substituted cycloalkyl group, an optionally substituted aryl group, or an optionally substituted heterocyclic group,
Z is a terminal group, and
Q is a main chain part comprising two or more constituent units of formula (a')

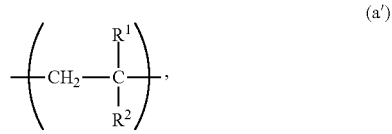

wherein, in formula (a'),
R¹ is H, a methyl group, or CH₂OH, and
R² is OR³, a halogen atom, COR⁴, COOR⁵, CN, CONR⁶R⁷, or R⁸, R³ to R⁷ each independently being H, an optionally substituted alkyl group, an optionally substituted alicyclic group, an optionally substituted aryl group, an optionally substituted heteroaryl group, an optionally substituted nonaromatic heterocyclic group, an optionally substituted aralkyl group, an optionally substituted alkaryl group, or an optionally substituted organosilyl group substituent group(s) of each of these groups being at least one selected from the group consisting of a carboxylic acid group, a carboxylic acid ester group, an epoxy group, a hydroxy group, an alkoxy group, a primary amino group, a secondary amino group, a tertiary amino group, an isocyanato group, a sulfonic acid group, and a halogen atom, and
R⁸ is an optionally substituted aryl group or an optionally substituted heteroaryl group, substituent group(s) of each of these groups being at least one selected from the group consisting of a carboxylic acid group, a carboxylic acid ester group, an epoxy group, a hydroxy group, an alkoxy group, a primary amino group, a secondary amino group, a tertiary amino group, an isocyanato group, a sulfonic acid group, an optionally substituted alkyl group, an optionally substituted aryl group, an optionally substituted olefin group, and a halogen atom.

2. A coating material composition comprising a (meth)acrylic copolymer (A) and a polyisocyanate compound or blocked polyisocyanate compound,
wherein the (meth)acrylic copolymer has an acid value greater than 0 mgKOH/g and equal to or less than 80 mgKOH/g, and comprises:
a macromonomer constituent unit (a), and
a constituent unit (b) derived from a vinyl monomer,
wherein the constituent unit (a) is present in a range of from 30 to 60% by mass with respect to a total mass of all constituent units of the (meth)acrylic copolymer (A),
wherein the constituent unit (b) comprises a constituent unit derived a carboxyl group-comprising vinyl-based monomer,
wherein the (meth)acrylic copolymer (A) comprises a mixture of constituent units having primary hydroxyl groups and secondary/tertiary hydroxyl groups and a content of the constituent unit having secondary/tertiary hydroxyl groups is greater than 50% by mass and equal to or less than 95% by mass with respect to the total mass of the constituent unit that has a hydroxyl group,
wherein the (meth)acrylic copolymer (A) comprises no more than 30 parts by mass of a constituent unit having a primary hydroxyl group, with respect to 100 parts by mass of the constituent unit (a) and the constituent unit (b), and
wherein a gel fraction of one day after coating is equal to or less than 70%,
wherein a gel fraction of eight days after coating is equal to or greater than 80%, and
wherein the macromonomer (a) is of formula (1)

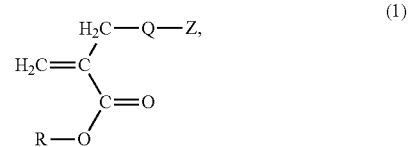

wherein, in formula (1),
R is H, an optionally substituted alkyl group, an optionally substituted cycloalkyl group, an optionally substituted aryl group, or an optionally substituted heterocyclic group,
Z is a terminal group, and
Q is a main chain part comprising two or more constituent units of formula (a')

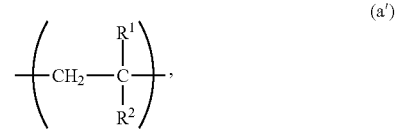

wherein, in formula (a'),
R¹ is H, a methyl group, or CH₂OH, and
R² is OR³, a halogen atom, COR⁴, COOR⁵, CN, CONR⁶R⁷, or R⁸, R³ to R⁷ each independently being H, an optionally substituted alkyl group, an optionally substituted alicyclic group, an optionally substituted aryl group, an optionally substituted heteroaryl group, an optionally substituted nonaromatic heterocyclic group, an optionally substituted aralkyl group, an optionally substituted alkaryl group, or an optionally substituted organosilyl group, substituent group(s) of each of these groups is at least one selected from the group consisting of a carboxylic acid group, a carboxylic acid ester group, an epoxy group, a hydroxy group, an alkoxy group, a primary amino group, a secondary amino group, a tertiary amino group, an isocyanato group, a sulfonic acid group, and a halogen atom, and
R⁸ is an optionally substituted aryl group or an optionally substituted heteroaryl group, substituent group(s) of each of these groups being at least one selected from the group consisting of a carboxylic acid group, a carboxylic acid ester group, an epoxy group, a hydroxy group, an alkoxy group, a primary amino group, a secondary amino group, a tertiary amino group, an isocyanato group, a sulfonic acid group, an optionally substituted alkyl group, an optionally substituted aryl group, an optionally substituted olefin group, and a halogen atom.

3. A coating material composition comprising a (meth)acrylic copolymer (A) and a polyisocyanate compound or blocked polyisocyanate compound,
wherein the (meth)acrylic copolymer has an acid value greater than 0 mgKOH/g and equal to or less than 80 mgKOH/g, and comprises:
a macromonomer constituent unit (a); and
a constituent unit (b) derived from a vinyl monomer, wherein the constituent unit (a) is present in a range of from 30 to 60% by mass with respect to a total mass of all constituent units of the (meth)acrylic copolymer (A), wherein the constituent unit (b) comprises a constituent unit derived a carboxyl group-containing vinyl-based monomer, wherein the (meth)acrylic copolymer (A) comprises a mixture of constituent units having primary hydroxyl groups and secondary/tertiary hydroxyl groups and a content of the constituent unit having secondary/tertiary hydroxyl groups is greater than 50% by mass and equal to or less than 95% by mass with respect to the total mass of the constituent unit that has a hydroxyl group, wherein the (meth)acrylic copolymer (A) comprises no more than 30 parts by mass of a constituent unit having a primary hydroxyl group, with respect to 100 parts by mass of the constituent unit (a) and the constituent unit (b), and wherein a relationship between a gel fraction of one day after coating and a gel fraction of eight days after coating follows formula (I)

$$100 \geq GF_{8d} - GF_{1d} \geq 40 \tag{I}$$

$GF_{8d}$ being the gel fraction of eight days after coating and $GF_{1d}$ being the gel fraction of one day after coating, and wherein the macromonomer (A) is of formula (1)

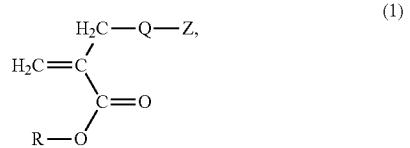

wherein, in formula (1),

R is H, an optionally substituted alkyl group, an optionally substituted cycloalkyl group, an optionally substituted aryl group, or an optionally substituted heterocyclic group, Z is a terminal group, and Q is a main chain part comprising two or more constituent units of formula (a')

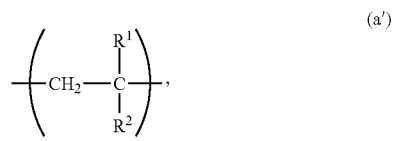

wherein, in formula (a'), $R^1$ is H, a methyl group, or $CH_2OH$, and $R^2$ represents $OR^3$, a halogen atom, $COR^4$, $COOR^5$, CN, $CONR^6R^7$, or $R^8$, $R^3$ to $R^7$ each independently being H, an optionally substituted alkyl group, an optionally substituted alicyclic group, an optionally substituted aryl group, an optionally substituted heteroaryl group, an optionally substituted nonaromatic heterocyclic group, an optionally substituted aralkyl group, an optionally substituted alkaryl group, or an optionally substituted organosilyl group, the substituent group(s) of each of these groups being at least one selected from the group consisting of a carboxylic acid group, a carboxylic acid ester group, an epoxy group, a hydroxy group, an alkoxy group, a primary amino group, a secondary amino group, a tertiary amino group, an isocyanato group, a sulfonic acid group, and a halogen atom, and $R^8$ is an optionally substituted aryl group or an optionally substituted heteroaryl group, the substituent group(s) of each of these groups being at least one selected from the group consisting of a carboxylic acid group, a carboxylic acid ester group, an epoxy group, a hydroxy group, an alkoxy group, a primary amino group, a secondary amino group, a tertiary amino group, an isocyanato group, a sulfonic acid group, an optionally substituted alkyl group, an optionally substituted aryl group, an optionally substituted olefin group, and a halogen atom.

4. The coating material composition of claim 1, wherein a number average molecular weight of the macromonomer (a) is from 500 to 100000.

5. The coating material composition of claim 1, wherein the (meth)acrylic copolymer (A) is present in at least 30 parts by mass, with respect to a solid content of a resin in the coating material composition.

6. The coating material composition of claim 1, wherein a Martens hardness of a coating film obtained with the coating material composition one day after coating is equal to or less than 10, and wherein a Martens hardness of the coating film eight days after coating is equal to or greater than 100.

7. A coated article that is coated with the coating material composition of claim 1.

8. A method for forming a multilayer coating film, the method comprising:

forming a first coloring base coating film by applying first coloring base coating to a cured coating film of an electrodeposition coating;

forming a second coloring base coating film by applying a second coloring base coating to the first coloring base coating film, then forming a clear coating film by preheating the first coloring base coating film and the second coloring base coating film and then coating a clear coating on the second coloring base coating film, and thermally curing the formed three coating films to form a multilayer coating film at the same time, wherein the clear coating uses the coating material composition of claim 1.

9. The coating material composition of claim 1, further comprising an organic solvent, wherein the vinyl monomer (b) is not a macromonomer.

10. The coating material composition of claim 2, wherein the vinyl monomer (b) is not a macromonomer.

11. The coating material composition of claim 3, wherein the vinyl monomer (b) is not a macromonomer.

12. The coating material composition of claim 1, wherein either the constituent unit (b) does not comprise a hydroxyl group or the constituent unit (a) does not comprise a hydroxyl group.

13. The coating material composition of claim 2, wherein either the constituent unit (b) does not comprise a hydroxyl group or the constituent unit (a) does not comprise a hydroxyl group.

14. The coating material composition of claim 3, wherein either the constituent unit (b) does not comprise a hydroxyl group or the constituent unit (a) does not comprise a hydroxyl group.

15. The coating material composition of claim 1, wherein the vinyl monomer (b) is not a macromonomer, and either the constituent unit (b) does not comprise a hydroxyl group or the constituent unit (a) does not comprise a hydroxyl group.

16. The coating material composition of claim 2, wherein the vinyl monomer (b) is not a macromonomer, and either the constituent unit (b) does not comprise a hydroxyl group or the constituent unit (a) does not comprise a hydroxyl group.

17. The coating material composition of claim 3, wherein the vinyl monomer (b) is not a macromonomer, and either the constituent unit (b) does not comprise a hydroxyl group or the constituent unit (a) does not comprise a hydroxyl group.

* * * * *